United States Patent
Franciosi

(10) Patent No.: US 11,972,284 B2
(45) Date of Patent: Apr. 30, 2024

(54) VIRTUAL MACHINE MEMORY SNAPSHOTS IN PERSISTENT MEMORY

(71) Applicant: NUTANIX, INC., San Jose, CA (US)

(72) Inventor: Felipe Franciosi, Cambridge (GB)

(73) Assignee: NUTANIX, INC., San Jose, CA (US)

( * ) Notice: Subject to any disclaimer, the term of this patent is extended or adjusted under 35 U.S.C. 154(b) by 95 days.

(21) Appl. No.: 17/718,143

(22) Filed: Apr. 11, 2022

(65) Prior Publication Data
US 2022/0326849 A1     Oct. 13, 2022

Related U.S. Application Data

(60) Provisional application No. 63/174,222, filed on Apr. 13, 2021.

(51) Int. Cl.
| | | |
|---|---|---|
| G06F 9/455 | (2018.01) | |
| G06F 3/06 | (2006.01) | |
| G06F 9/50 | (2006.01) | |

(52) U.S. Cl.
CPC ........ G06F 9/45558 (2013.01); G06F 3/0604 (2013.01); G06F 3/064 (2013.01); G06F 3/0673 (2013.01); G06F 9/5016 (2013.01); G06F 2009/45583 (2013.01)

(58) Field of Classification Search
CPC ....... G06F 3/0604; G06F 3/064; G06F 3/0673
See application file for complete search history.

(56) References Cited

U.S. PATENT DOCUMENTS

| | | |
|---|---|---|
| 8,549,518 B1 | 10/2013 | Aron et al. |
| 8,601,473 B1 | 12/2013 | Aron et al. |
| 8,850,130 B1 | 9/2014 | Aron et al. |
| 8,863,124 B1 | 10/2014 | Aron |
| 9,009,106 B1 | 4/2015 | Aron et al. |
| 9,069,708 B2 | 6/2015 | Gill et al. |
| 9,336,132 B1 | 5/2016 | Aron et al. |
| 9,652,265 B1 | 5/2017 | Narayanasamy et al. |
| 9,747,287 B1 | 8/2017 | Bhardwaj et al. |

(Continued)

FOREIGN PATENT DOCUMENTS

| | | |
|---|---|---|
| CN | 109324874 A | 2/2019 |
| CN | 111078368 A | 4/2020 |
| WO | 2017/052962 A1 | 3/2017 |

OTHER PUBLICATIONS

Mashtizadeh et al., The Design and Evolution of Live Storage Migration in VMware ESX, 2011, VMware, 14 pages (Year: 2011).*

(Continued)

Primary Examiner — Gary W. Cygiel
(74) Attorney, Agent, or Firm — Artegis Law Group, LLP

(57) ABSTRACT

Various embodiments set forth techniques for taking a snapshot of virtual memory of a virtual machine. One technique includes allocating, in a persistent memory, one or more blocks associated with a virtual memory; detecting a write request associated with a first portion of the virtual memory; in response to detecting the write request associated with the first portion, prioritizing the first portion; based on the prioritizing, copying the first portion into the one or more blocks in the persistent memory ahead of a second portion of the virtual memory; and after copying the first portion: applying the write request to the first portion; and copying the second portion into the one or more blocks in the persistent memory.

23 Claims, 26 Drawing Sheets

(56) References Cited

U.S. PATENT DOCUMENTS

| | | |
|---|---|---|
| 9,772,866 B1 | 9/2017 | Aron et al. |
| 10,503,607 B2 | 12/2019 | Zhang |
| 10,909,072 B2 | 2/2021 | Sun et al. |
| 2009/0265706 A1* | 10/2009 | Golosovker .......... G06F 9/4856 718/1 |
| 2015/0066859 A1 | 3/2015 | Blake |

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown); pp. all.

Poitras, Steven. "The Nutanix Bible" (Jan. 11, 2014), from http://stevenpoitras.com/the-nutanix-bible/ (Publication date based on indicated capture date by Archive.org; first publication date unknown); pp. all.

Poitras, Steven. "The Nutanix Bible" (Jun. 20, 2014), from http://stevenpoitras.com/the-nutanix-bible/ (Publication date based on indicated capture date by Archive.org; first publication date unknown); pp. all.

Poitras, Steven. "The Nutanix Bible" (Jan. 7, 2015), from http://stevenpoitras.com/the-nutanix-bible/ (Publication date based on indicated capture date by Archive.org; first publication date unknown); pp. all.

Poitras, Steven. "The Nutanix Bible" (Jun. 9, 2015), from http://stevenpoitras.com/the-nutanix-bible/ (Publication date based on indicated capture date by Archive.org; first publication date unknown); pp. all.

Poitras, Steven. "The Nutanix Bible" (Sep. 4, 2015), from https://nutanixbible.com/; pp. all.

Poitras, Steven. "The Nutanix Bible" (Jan. 12, 2016), from https://nutanixbible.com/ ; pp. all.

Poitras, Steven. "The Nutanix Bible" (Jun. 9, 2016), from https://nutanixbible.com/; pp. all.

Poitras, Steven. "The Nutanix Bible" (Jan. 3, 2017), from https://nutanixbible.com/; pp. all.

Poitras, Steven. "The Nutanix Bible" (Jun. 8, 2017), from https://nutanixbible.com/; pp. all.

Poitras, Steven. "The Nutanix Bible" (Jan. 3, 2018), from https://nutanixbible.com/; pp. all.

Poitras, Steven. "The Nutanix Bible" (Jun. 25, 2018), from https://nutanixbible.com/; pp. all.

Poitras, Steven. "The Nutanix Bible" (Jan. 8, 2019), from https://nutanixbible.com/; pp. all.

Poitras, Steven. "The Nutanix Bible" (Jul. 25, 2019), from https://nutanixbible.com/; pp. all.

Poitras, Steven. "The Nutanix Bible" (Sep. 17, 2019), from https://nutanixbible.com/; pp. all.

Cano, Ignacio et al. "Curator: Self-Managing Storage for Enterprise Clusters"; University of Washington; published Mar. 2017; pp. all.

Poitras, Steven. "The Nutanix Bible" (Mar. 2, 2020), from https://nutanixbible.com/; pp. all.

Poitras, Steven. "The Nutanix Bible" (Sep. 1, 2020), from https://nutanixbible.com/; pp. all.

Ruprecht et al., "VM Live Migration At Scale", https://doi.org/10.1145/3186411.3186415, Mar. 25, 2018, pp. 45-56.

Memverge, "Create a Highly Available Memory Tier", Retrieved from https://memverge.com/create-a-highly-available-memory-tier/, Mar. 11, 2021, 4 pages.

Memverge, "Memory Machine", Retrieved from https://memverge.com/memory-machine/, Mar. 11, 2021, 9 pages.

VMWARE, "Overview of virtual machine snapshots in vSphere (1015180)", Retrieved from https://kb.vmware.com/s/article/1015180, Apr. 23, 2021, 8 pages.

VMWARE, "Take a Snapshot of a Virtual Machine", Retrieved from https://docs.vmware.com/en/VMware-vSphere/7.0/com.vmware.vsphere.vm_admin.doc/GUID-9720B104-9875-4C2C-A878-F1C351A4F3D8.html, Apr. 23, 2021, 2 pages.

VxFlex, "VxFlex OS: Virtual Machine Pause when performing Vmware Snapshot With virtual machine Memory", Retrieved from https://www.dell.com/support/kbdoc/en-in/000055600/vxflex-os-virtual-machine-pause-when-performing-vmware-snapshot-with-virtual-machine-memory, on Apr. 23, 2021, 2020, 2 pages.

Li et al., "Persisting Memcached with VM Memory Snapshot", 2017 IEEE International Symposium on Parallel and Distributed Processing with Applications and 2017 IEEE International Conference on Ubiquitous Computing and Communications, DOI 10.1109/ISPA/IUCC.2017.00018, 2017, pp. 58-65.

Memverge, "Zero-Impact Crash Recovery for Kdb+", Retrieved from https://kx3.cc0.myftpupload.com/wp-content/uploads/2020/09/Techical-Brief-Zero-Impact-Crash-Recovery-for-kdb-v6.pdf, 8 pages.

Memverge, "Increase Availability with Lightning Fast In-Memory Database Crash Recovery", Retrieved from https://kx3.cc0.myftpupload.com/wp-content/uploads/2020/09/Technology-Brief_Crash-Recovery.pdf, 6 pages.

\* cited by examiner

| Block | Snapshot Status | Write? |
|---|---|---|
| 0 | Not Copied | No |
| 1 | Not Copied | No |
| 2 | Not Copied | No |
| 3 | Not Copied | No |
| ... | ... | |
| 105 | Not Copied | No |
| 106 | Not Copied | No |
| 107 | Not Copied | No |
| 108 | Not Copied | No |
| ... | ... | |
| N-2 | Not Copied | No |
| N-1 | Not Copied | No |

FIG. 6A

| Block | Snapshot Status | Write? |
|---|---|---|
| 0 | Copied | N/A |
| 1 | Copied | N/A |
| 2 | Copied | N/A |
| 3 | Copied | N/A |
| ... | ... | ... |
| 105 | Copied | N/A |
| 106 | Not Copied | No |
| 107 | Not Copied | No |
| 108 | Not Copied | Yes |
| ... | ... | ... |
| N-2 | Not Copied | No |
| N-1 | Not Copied | No |

FIG. 6B

| Block | Snapshot Status | Write? |
|---|---|---|
| 0 | Copied | N/A |
| 1 | Copied | N/A |
| 2 | Copied | N/A |
| 3 | Copied | N/A |
| ... | | |
| 105 | Copied | N/A |
| 106 | Copied | N/A |
| 107 | Not Copied | No |
| 108' | Copied (pre-write) | N/A |
| ... | | |
| N-2 | Not Copied | No |
| N-1 | Not Copied | No |

FIG. 6D

| Block | Annotation | Write? |
|---|---|---|
| 0 | 1 | No |
| 1 | 1 | No |
| 2 | 1 | No |
| 3 | 1 | No |
| ... | ... | ... |
| 105 | 1 | No |
| 106 | 1 | No |
| 107 | 1 | No |
| 108 | 1 | No |
| ... | ... | ... |
| N-2 | 1 | No |
| N-1 | 1 | No |

FIG. 8A

| Block | Annotation | Write? |
|---|---|---|
| 0 | 0 | No |
| 1 | 0 | No |
| 2 | 0 | No |
| 3 | 0 | No |
| ... | ... | |
| 105' | 0 | Yes, applied |
| 106 | 0 | No |
| 107' | 0 | Yes, applied |
| 108 | 0 | No |
| ... | ... | |
| N-2 | 0 | No |
| N-1 | 0 | No |

FIG. 8D

VIRTUAL MACHINE MEMORY SNAPSHOTS IN PERSISTENT MEMORY

CROSS-REFERENCE TO RELATED APPLICATIONS

This application claims the benefit of U.S. Provisional Application No. 63/174,222, titled "VIRTUAL MACHINE MEMORY SNAPSHOTS IN PERSISTENT MEMORY," and filed on Apr. 13, 2021. The subject matter of this related application is incorporated by reference in its entirety.

TECHNICAL FIELD

The contemplated embodiments relate generally to management of a virtual machine in a computing system and, more specifically, to virtual machine memory snapshots in persistent memory.

BACKGROUND

Virtualization is an important feature in modern computing systems, such as enterprise-level computing systems. By creating a virtual version of a once-physical item, various applications and operating systems can be abstracted away from the hardware and/or software underneath. A popular aspect of virtualization is a virtual machine (VM), which emulates a computer system and runs on top of another system. A VM can have its own virtual memory and may have access to any number of computing resources, including physical memory, secondary storage, networks, input/output devices, and/or the like, via a hypervisor.

As part of the operation and management of a VM, snapshots of the VM may be taken. Snapshots of a VM record the states of components of the VM (e.g., virtual devices, virtual disk, virtual memory) at a given time, which can be used for various purposes (e.g., restoring to a certain state after a crash). A typical approach to taking a snapshot of a VM includes pausing the VM and/or suspending access to virtual storage or memory within the VM, saving the states to physical persistent storage, and then un-pausing the VM and/or un-suspending the access to virtual storage or memory.

A drawback of this approach to taking snapshots of the VM is that such an approach can have a great impact on the performance of the VM, in particular the virtual memory of the VM. Because the virtual memory can include a large amount of data to snapshot, on the order of gigabytes or terabytes in some cases, and access to virtual memory is very latency-sensitive, any pause of the VM and/or suspension of access could cause delays in many operations of the VM, thus greatly impacting the performance of the VM as a whole. Such delays are very much undesirable, especially when the VM is deployed in a system that handles many time-sensitive operations.

Accordingly, there is need for improved techniques for taking a snapshot of the virtual memory of a virtual machine.

SUMMARY

Various embodiments set forth one or more non-transitory computer-readable media storing program instructions that, when executed by one or more processors, cause the one or more processors to perform steps of for taking a snapshot of virtual memory of a virtual machine. The steps include allocating, in a persistent memory, one or more blocks associated with a virtual memory; detecting a write request associated with a first portion of the virtual memory; in response to detecting the write request associated with the first portion, prioritizing the first portion; based on the prioritizing, copying the first portion into the one or more blocks in the persistent memory ahead of a second portion of the virtual memory; and after copying the first portion: applying the write request to the first portion; and copying the second portion into the one or more blocks in the persistent memory.

Various embodiments set forth one or more non-transitory computer-readable media storing program instructions that, when executed by one or more processors, cause the one or more processors to perform steps of for taking a snapshot of virtual memory of a virtual machine. The steps include allocating, in a persistent memory, one or more blocks associated with a virtual memory; annotating a first portion of the virtual memory for copying in a first pass; copying the first portion into the one or more blocks in the persistent memory in the first pass; receiving a write request associated with the first portion; and in response to receiving the write request: applying the write request to the first portion; and annotating the first portion for copying in a second pass subsequent to the first pass.

Other embodiments include, without limitation, methods and systems that implement one or more aspects of the disclosed techniques, and one or more computer readable media including instructions for performing one or more aspects of the disclosed techniques.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIGS. 6A-6D are diagrams illustrating another example snapshot progress information associated with a snapshot operation, according to various embodiments of the present disclosure.

FIGS. 8A-8D are diagrams illustrating yet another example snapshot progress information associated with a snapshot operation, according to various embodiments of the present disclosure.

For clarity, identical reference numbers have been used, where applicable, to designate identical elements that are common between figures. It is contemplated that features of one embodiment may be incorporated in other embodiments without further recitation.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

Figure 1:
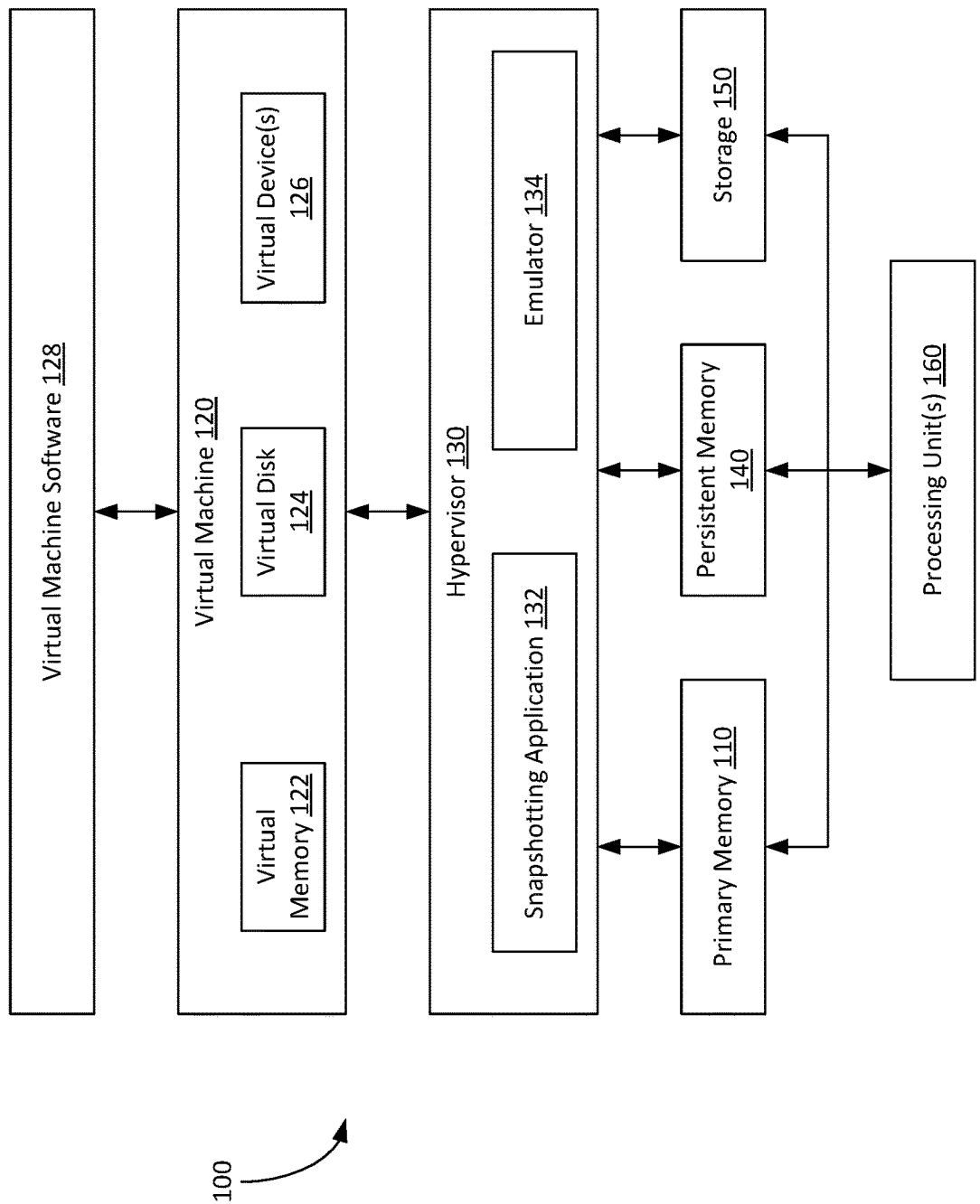
FIG. 1 is a block diagram illustrating a virtual computing environment according to various embodiments of the present disclosure.

FIG. 1 is a block diagram illustrating a virtual computing environment 100 according to various embodiments of the present disclosure. As shown in FIG. 1, virtual computing environment 100 is built around a virtual machine 120. In some embodiments, virtualized computing environment 100 and/or virtual machine 120 may be implemented in a cloud computing system, such as a public cloud, a private cloud, or a hybrid cloud that includes a combination of an on-premise data center and a public cloud, a private cloud, and/or the like. In various embodiments, virtual machine 120 includes a collection of software instructions that that serve to abstract details of underlying hardware or software components from one or more higher-level processing entities. Virtual machine 120 can serve as virtualization and/or emulation of a computer system on top of a physical computer system (e.g., emulate one platform on top of physical hardware running a different platform). Examples of underlying hardware and/or software that can be abstracted by virtual machine 120 include, for example and without limitation, memory (e.g., volatile memory), storage (e.g., disk or other non-volatile storage), one or more devices (e.g., I/O devices, etc.), an operating system (e.g., guest operation system), and one or more applications. As shown, virtual machine 120 includes a virtual memory 122, a virtual disk 124, and one or more virtual devices 126. Although virtual machines, such as virtual machine 120, are described in further detail below as a reference example, techniques disclosed herein can also be applied to other types of virtual computing environments, such as containers, that provide isolated computing environments. Containers can be implemented via an abstraction layer that executes on top of the kernel of an operating system (OS) in a node (or a VM) and provides OS-level virtualization in which each container runs as an isolated process on the OS.

Virtual computing environment 100 includes physical hardware that hosts virtual machine 120 and on which virtual machine 120 runs. The physical hardware can include, for example, one or more processing units 160, a primary memory 110, a persistent memory 140, and storage 150.

Primary memory 110 can include volatile media. Examples of volatile media include dynamic memory such as random access memory (RAM), and dynamic random access memory (DRAM).

Storage 150 can include non-volatile storage media. Examples of non-volatile storage media include solid state storage devices (SSDs), optical or magnetic disks such as hard disk drives (HDDs), and/or hybrid disk drives, or optical or magnetic media drives.

Persistent memory 140 can include non-volatile random-access memory. Persistent memory 140 has characteristics of random-access memory (e.g., allows random access), but can retain data across power cycles (e.g., data persists when power is turned off, data persists across reboots). Furthermore, persistent memory 140 is byte-addressable. An example of persistent memory 140 is the INTEL® OPTANE™ PERSISTENT MEMORY by Intel Corporation. In some embodiments, persistent memory 140 can operate in a memory mode, an "AppDirect" mode, or in a dual mode. In the memory mode, persistent memory 140 operates like volatile memory (e.g., is byte-addressable), and accordingly can be used as additional primary memory 110. In the AppDirect mode, persistent memory 140 operates with data persistence (can retain data across power cycles, as described above) and is byte-addressable. In the dual mode, a portion of persistent memory 140 operates in memory mode, and the remainder operates in AppDirect mode. Another example of persistent memory 140 is a non-volatile dual inline memory module (NVDIMM).

Processing unit(s) 160 include any suitable processors implemented as a central processing unit (CPU), a graphics processing unit (GPU), an application-specific integrated circuit (ASIC), a field programmable gate array (FPGA), an artificial intelligence (AI) accelerator, any other type of processor, or a combination of different processors, such as a CPU configured to operate in conjunction with a GPU. In general, the one or more processing units 160 may be any technically feasible hardware unit capable of processing data and/or executing software applications.

Virtual computing environment 100 also includes a hypervisor 130. Hypervisor 130 is host software, running on the physical hardware, that can manage execution of and operations on virtual machine 120, and can serve as an intermediary between virtual machine 120 and the physical hardware hosting virtual machine 120. In some embodiments, hypervisor 130 includes emulator 134 (e.g., a virtual machine monitor), which can allocate space in primary memory 110 to store virtual memory 122 and perform various other functions associated with execution of virtual machine 120.

In some embodiments, a snapshotting application 132 runs on the physical hardware. Snapshotting application 132 is configured to perform snapshots of virtual machine 120 and/or components of virtual machine 120 (e.g., virtual memory 122, virtual disk 124, virtual device(s) 126). As shown, in some embodiments, snapshotting application 132 can be a component application or module of hypervisor 130, but in some other embodiments, snapshotting application 132 can be an application distinct from hypervisor 130 and running on the physical hardware. In some embodiments, hypervisor 130, snapshotting application 132, and emulator 134 are loaded into primary memory 110 and executed by processing unit(s) 160 from primary memory 110.

Virtual machine software 128 can run on virtual machine 120. Virtual machine software 128 can include any software configured to run on whatever hardware and/or software platform that is being emulated or virtualized by virtual machine 120. In some embodiments, virtual machine software 128 includes a guest operating system (e.g., an operating system associated with the platform being emulated or virtualized by virtual machine 120).

In some embodiments, virtual computing environment 100 includes address translation for translating locations (e.g., addresses) in virtual memory 122 and/or virtual disk 124 to locations (e.g., addresses) in primary memory 110, persistent memory 140, and/or storage 150. The address translation can be performed using any technically feasible technique, including, for example and without limitation, extended page tables (EPT). In some embodiments, the address translation enables virtual machine software 128, which is running on virtual machine 120 that is running via processing unit(s) 160 to directly access the portion of primary memory 110 allocated to virtual memory 122 without necessarily going through hypervisor 130.

Virtual memory 122 can have associated permissions. For example, virtual memory 122 can have read-only or read/write permission. In various embodiments, virtual memory 122 can have per-portion permissions (e.g., per page, per block). For example, a portion of virtual memory 122 could be read-only and the remainder could have read/write permission. In some embodiments, permissions can be enforced at the address translation level. For example, extended page tables can include permissions per page.

In various embodiments, a snapshot of one or more components of virtual machine 120 can be taken. A snapshot captures the state(s) and/or data of the one or more components at a given time. Snapshot(s) can be taken for virtual memory 122, virtual disk 124, and/or virtual device(s) 126. Snapshots can be stored persistently (e.g., in storage 150) for later retrieval (e.g., for crash recovery or virtual machine cloning purposes). A conventional approach to taking a snapshot includes copying data contents in primary memory 110 that correspond to data in virtual memory 122 to storage 150.

A drawback of the above-described conventional approach to taking a snapshot is that the approach requires pausing virtual machine 120 to take the snapshot. Pausing virtual machine 120 causes a delay in operation of virtual machine 120. The delay can have a great impact on the performance of virtual machine 120, especially if virtual memory 122 is large (e.g., on the order of gigabytes or terabytes).

To address this and other drawbacks of taking a snapshot of a virtual machine, techniques for taking a snapshot to a persistent memory (e.g., persistent memory 140) are disclosed herein. Because copying data to persistent memory 140 is quicker than copying to storage 150, a snapshot can be taken with little or no pausing of virtual machine 120. Accordingly, taking a snapshot using the disclosed techniques can have a reduced impact on the performance of virtual machine 120.

Figure 2:
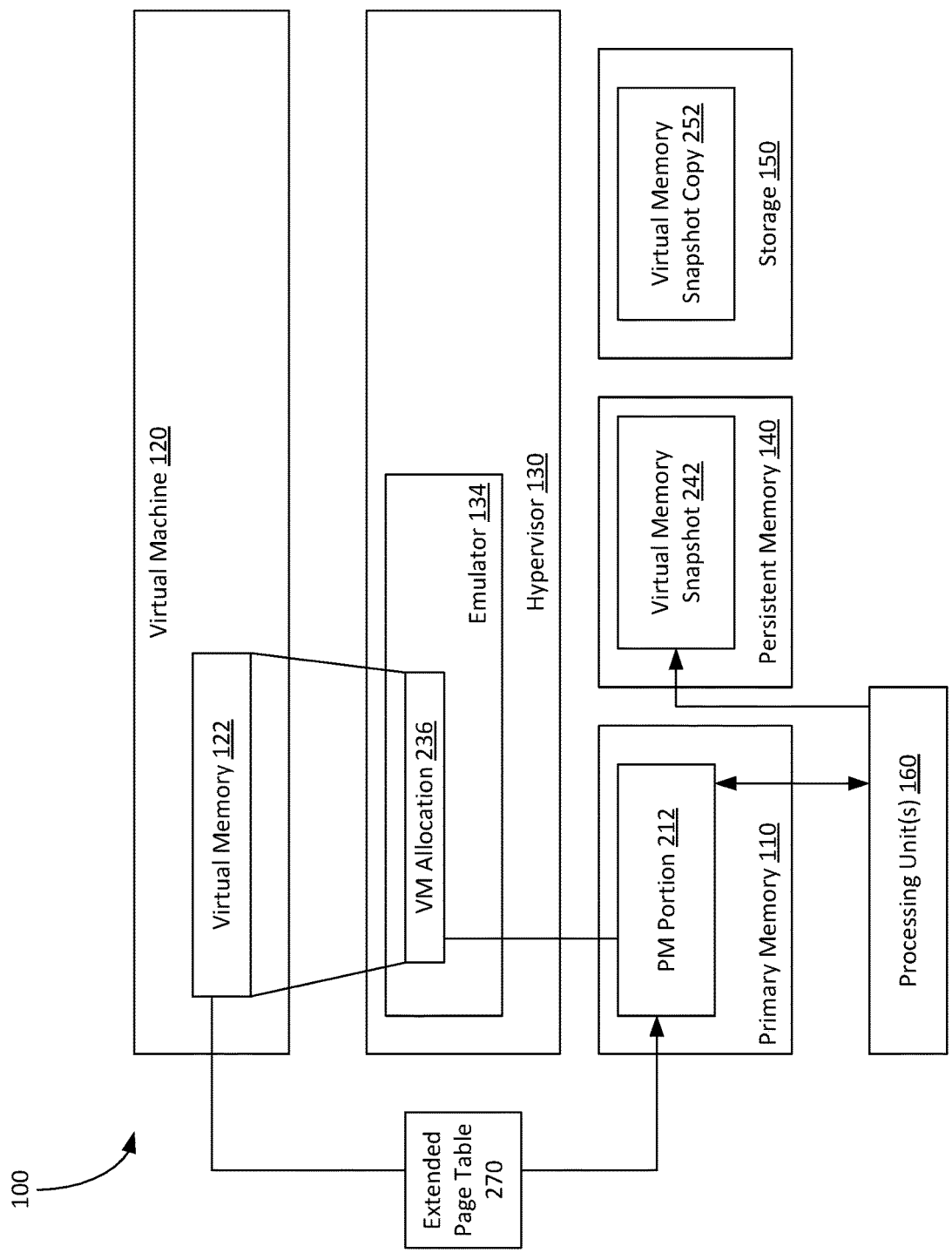
FIG. 2 is a block diagram illustrating a snapshot operation in the virtual computing environment of FIG. 1 according to various embodiments of the present disclosure.

FIG. 2 is a block diagram illustrating a snapshot operation in virtual computing environment 100 according to various embodiments of the present disclosure. As shown, emulator 134 in hypervisor 130 can generate a VM allocation 236, which allocates a portion of primary memory 110, primary memory (PM) portion 212, to serve as virtual memory 122 of virtual machine 120. Emulator 134 generates and tracks VM allocation 236. In some embodiments, emulator 134 can also generate an extended page table (EPT) 270 for translating addresses between virtual memory 122 and PM portion 212. When an instruction to access virtual memory 122 (e.g., a read) is issued by virtual machine software 128, the portions of PM portion 212 relevant to the instruction can be accessed directly using one or more addresses translated by EPT 270.

As described above, a snapshot of virtual machine 120, including virtual memory 122, can be taken. To take a snapshot of virtual memory 122, a snapshot of PM portion 212 is taken by copying the contents of PM portion 212 into persistent memory 140 as virtual memory snapshot 242, using any of the techniques described below. Virtual memory snapshot 242 can subsequently be copied or moved into storage 150 as virtual memory snapshot copy 252.

In various embodiments, processing unit(s) 160 can concurrently run emulator 134, and thereby run virtual machine 120, and take a snapshot of PM portion 212. For example, if processing unit(s) 160 includes at least two central processing units (CPUs), one CPU can run emulator 134 and another emulator can take a snapshot of PM portion 212 (e.g., running snapshotting application 132 to take the snapshot). When virtual machine 120 is run concurrently with the taking of a snapshot of PM portion 212, snapshotting application 132 and/or emulator 134 can implement one or more techniques to ensure consistency of the snapshot against data write instructions that are received during the snapshotting process, the details of which are described below.

Figure 3:
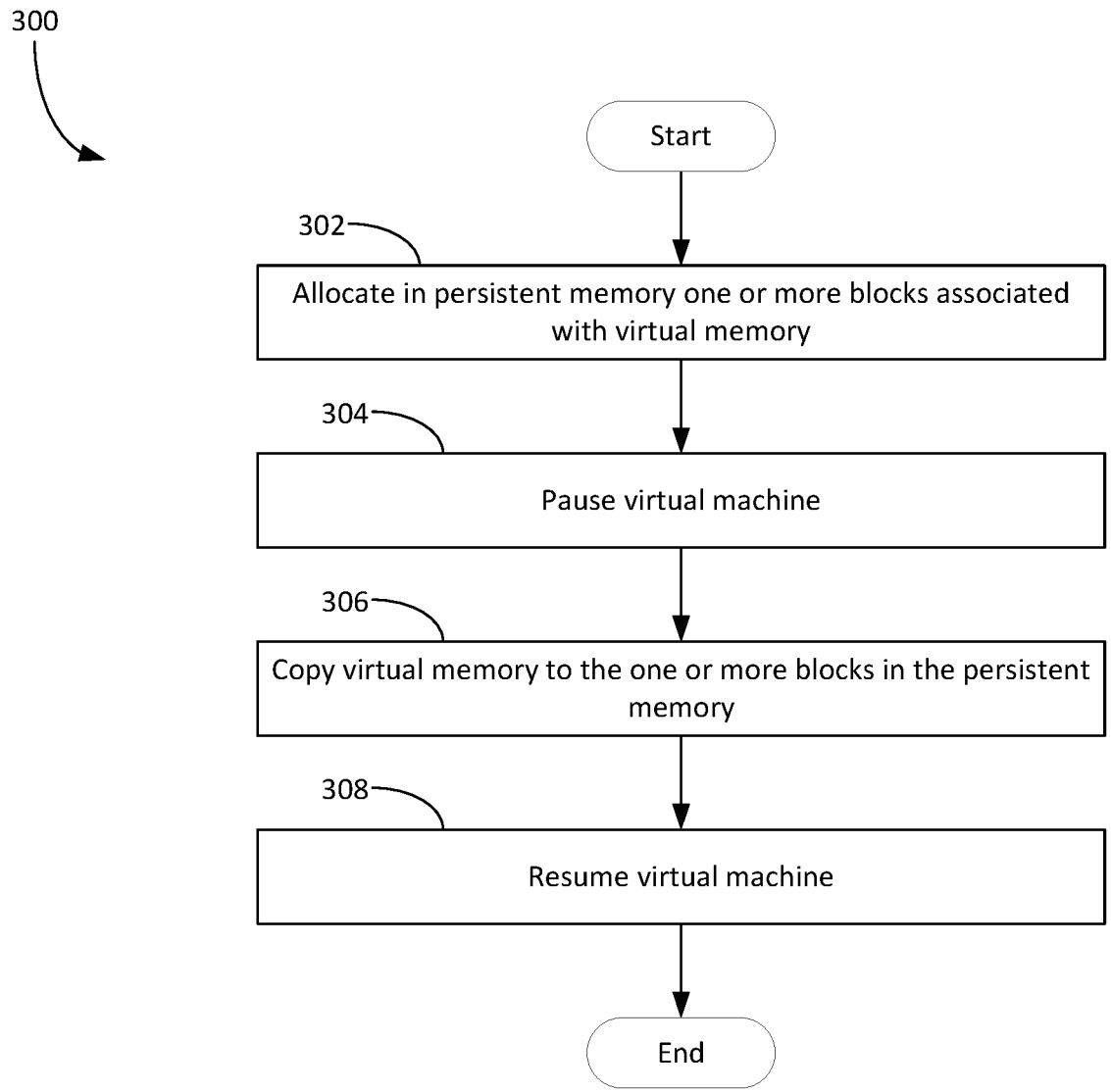
FIG. 3 is a flow chart of method steps for taking a snapshot of a virtual memory of a virtual machine, according to various embodiments of the present disclosure.

FIG. 3 is a flow chart of method steps for taking a snapshot of a virtual memory of a virtual machine, according to various embodiments of the present disclosure. Although the method steps are described with respect to the systems of FIGS. 1-2 and FIGS. 10A-11, persons skilled in the art will understand that any system configured to perform the method steps, in any order, falls within the scope of the various embodiments.

As shown, a method 300 begins at step 302, where a snapshotting application 132 allocates one or more blocks in persistent memory 140. The allocated block(s) are associated with virtual memory 122 of virtual machine 120, and correspondingly, associated with PM portion 212 allocated to virtual memory 122. In some embodiments, the allocated block(s) correspond to space in persistent memory 140 allocated for a virtual memory snapshot 242.

At step 304, the snapshotting application pauses virtual machine 120. Snapshotting application 132 pauses the execution, and also freezes the data and states, of virtual machine 120 (and accordingly also of virtual machine software 128). For example, snapshotting application 132 can signal emulator 134 to pause execution of virtual machine 120. Accordingly, the data of virtual memory 122 in PM portion 212 is frozen while virtual machine 120 are paused. While virtual machine 120 is paused, operations associated with virtual machine 120 (e.g., attempts to write to virtual memory 122) can be held back (e.g., trapped) hypervisor 130 (e.g., queued by emulator 134). In some embodiments, operations that do not affect the data contents of virtual memory 122 and/or the states of virtual machine 120 (e.g., reads) need not be held back and can be executed even while virtual machine 120 is paused.

At step 306, the snapshotting application copies the virtual memory to the one or more blocks in the persistent memory. Snapshotting application 132 copies the contents of virtual memory 122, as stored in PM portion 212, into persistent memory 140 (e.g., into the block(s) in persistent memory 140 allocated for virtual memory snapshot 242 in step 302). For example, snapshotting application 132 can copy PM portion 212 into virtual memory snapshot 242 in persistent memory 140. When the copying in step 306 is completed, a full copy of PM Portion 212 is copied to the allocated blocks in persistent memory 140 as virtual memory snapshot 242.

At step 308, the snapshotting application resumes the virtual machine. After a snapshot copy of PM portion 212 is made as virtual memory snapshot 242, snapshotting application 132 can restart virtual machine 120 and/or unfreeze the data and states of virtual machine 120. Then method 300 can end. Any operations that were held back because of the pausing of virtual machine 120 can be applied after the resumption of virtual machine 120. Further, method 300 can be performed again to take a new snapshot of virtual memory 122.

In some embodiments, after a full copy of PM portion 212 is copied to persistent memory 140 as virtual memory snapshot 242 in step 306, snapshotting application 132 can copy or move virtual memory snapshot 242 in persistent memory 140 into storage 150 as virtual memory snapshot copy 252. After virtual memory snapshot 242 is copied or moved into storage 150 as virtual memory snapshot copy 252, snapshotting application 132 can deallocate the allocated blocks in persistent memory 140 holding virtual memory snapshot 242. Those deallocated blocks can then be reallocated (e.g., to a subsequent virtual memory snapshot 242). Method 300 can be performed again to take a new snapshot of virtual memory 122.

FIGS. 4A-4E are diagrams illustrating example snapshot progress information associated with a snapshot operation, according to various embodiments of the present disclosure. In some embodiments, techniques for taking a snapshot of virtual memory 122 forgoes pausing virtual machine 120, as in method 300. One such technique is illustrated via example snapshot progress information illustrated in FIGS. 4A-4E.

Figure 4A:
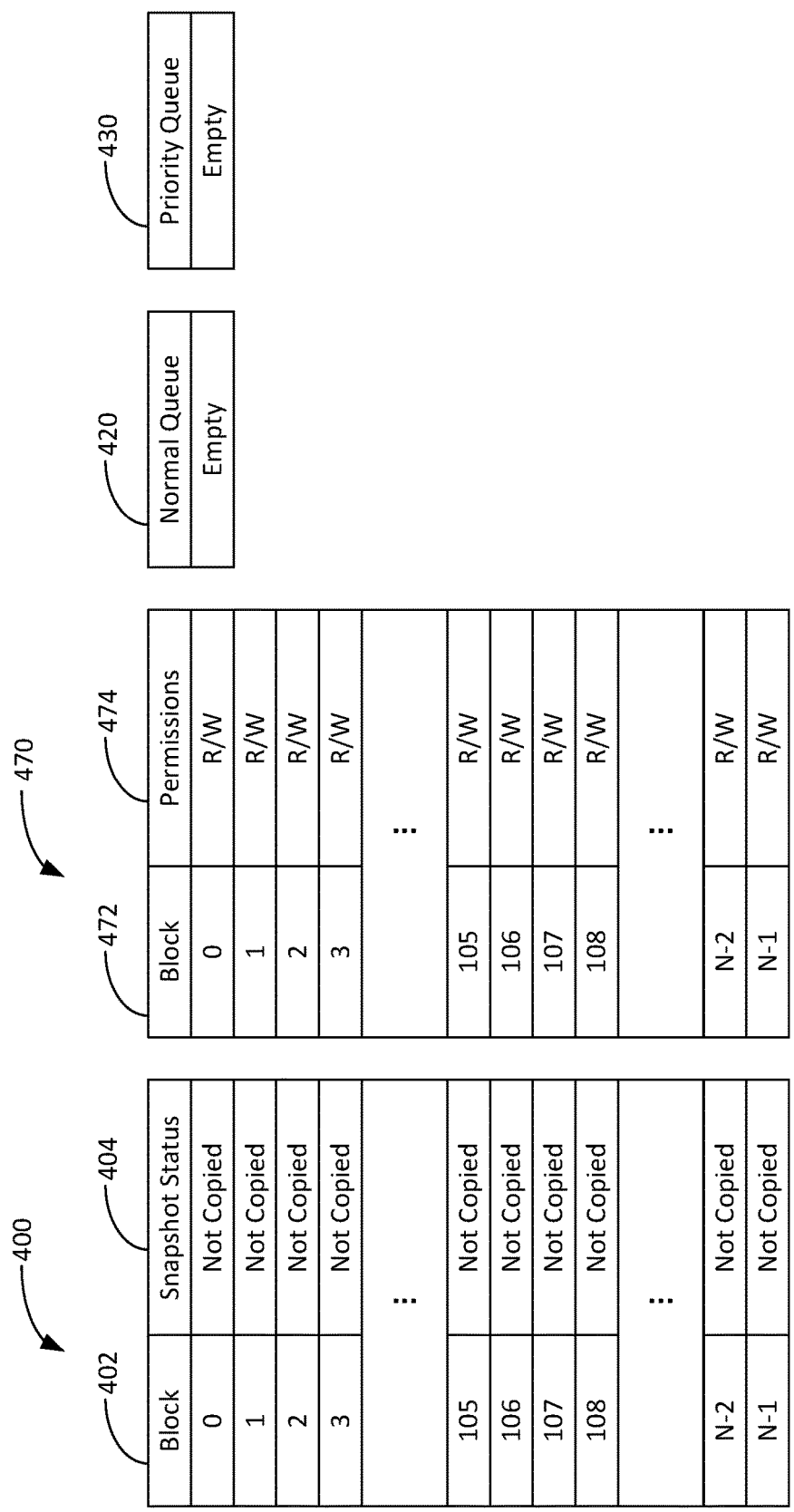
FIGS. 4A-4E are diagrams illustrating an example snapshot progress information associated with a snapshot operation, according to various embodiments of the present disclosure.

In FIG. 4A, a table 400 includes columns 402 and 404. Column 402 indicates identifiers of addressable unit portions (e.g., addressable blocks, addressable pages, memory addresses) of virtual memory 122 (or, more particularly, identifiers of unit portions of PM portion 212 serving as virtual memory 122). As shown, virtual memory 122 includes N blocks, numbered from 0 to N−1 in FIGS. 4A-4E for simplicity and ease of understanding. In various implementations, the identifiers can be the addresses of the unit portions. Column 404 indicates a snapshot status of each block of virtual memory 122. In some examples, the copied/not copied status of a block in column 404 can be recorded using a single bit. The snapshot status of a block indicates whether the block has been copied into an outstanding virtual memory snapshot 242 in persistent memory 140.

FIG. 4A also illustrates a table 470 corresponding to a subset of the contents (in particular, a subset of the columns or fields) of an EPT. Table 470 includes a column 472 indicating the identifiers of the blocks of virtual memory 122 and a column 474 indicating the permissions for each block of virtual memory 122. In various embodiments, columns 472 and 474 are columns or fields in an EPT (e.g., EPT 270) among other additional data, columns, and/or fields (e.g., physical address at primary memory 110, translation mapping from virtual address to physical address, etc.). In some embodiments, table 470 corresponds to a portion of EPT 270. For simplicity and ease of understanding, the description below assumes two possible permissions: read-write ("R/W"; the block can be read or written/modified) or read-only (the block can be read but not written to or otherwise modified). In various implementations, the permissions can be more complex (e.g., read-only, read-write, read-write but no delete, read-only and executable, etc.).

FIG. 4A further illustrates a normal queue 420 and a priority queue 430, which indicate the order of copying of blocks to an outstanding virtual memory snapshot 242. Both queues are shown as empty in FIG. 4A. Normal queue 420 and a priority queue 430 are further described below.

FIG. 4A corresponds to a state in virtual computing environment 100 prior to a snapshot operation (e.g., between snapshot operations). That is, a previous virtual memory snapshot 242 had already been completed, and a new virtual memory snapshot 242 has not been started. Accordingly, the blocks have a not-copied status as shown in table 400; none of the blocks have been copied to a new virtual memory snapshot 242 yet. Also, the blocks have their current permissions prior to a new snapshot, which in this case are read-write permissions as shown in table 470. Of course, in various implementations, different blocks can have different permissions prior to the new snapshot (e.g., some block have read-write permission and others have read-only permission).

Figure 4B:
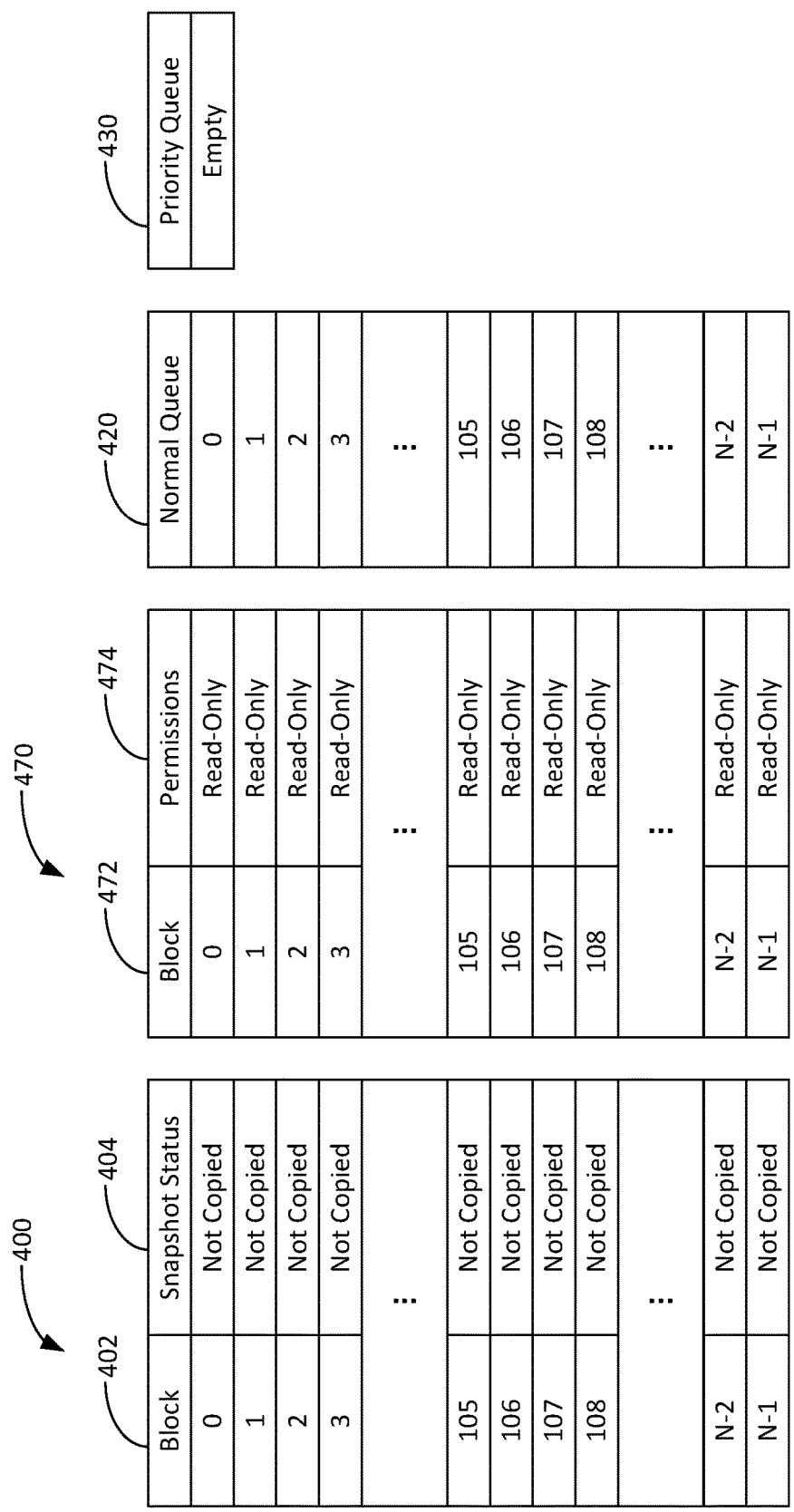

FIG. 4B corresponds to a state in virtual computing environment 100 when snapshotting application 132 initiates a snapshot operation to take a new virtual memory snapshot 242 of virtual memory 122. In preparation for taking the new virtual memory snapshot 242, snapshotting application 132 can change the permissions for the blocks of virtual memory 122 in table 470 to read-only. In some embodiments, the permissions in effect before the change in permissions (e.g., the permissions as shown in FIG. 4A) can be saved and stored in a memory or storage (e.g., primary memory 110, persistent memory 140, storage 150, another column of table 400 (not shown)) for later restoration. Accordingly, table 470 shown in FIG. 4B shows blocks 0 thru N−1 as having read-only permissions. Also, snapshotting application 132 can enqueue the identifiers of blocks 0 thru N−1 into normal queue 420. While the identifiers for the blocks are enqueued into normal queue 420 in ascending numerical order as shown, it should be appreciated that the identifiers for the blocks can be enqueued into normal queue 420 in any suitable order (e.g., random order, a predefined order, in ascending address order, in descending address order). Further, the permissions can be changed to any suitable permission that prohibits modification to the block (e.g., read-only, a more complex permission that prohibits writes and other modifications to the block) during the snapshot operation.

After the identifiers for the N blocks are enqueued and their permissions changed to read-only, snapshotting application 132 can proceed with the snapshot operation by copying virtual memory 122 block-by-block to the new virtual memory snapshot 242. Snapshotting application 132 can copy the blocks in the order of the identifiers for the blocks in normal queue 420. For example, snapshotting application 132 can dequeue the identifier for a block from the head of normal queue 420 and copy the block corresponding to the dequeued identifier to virtual memory snapshot 242. Snapshotting application 132 then restores the permission of the copied block to the permissions in effect prior to the snapshot operation.

Figure 4C:
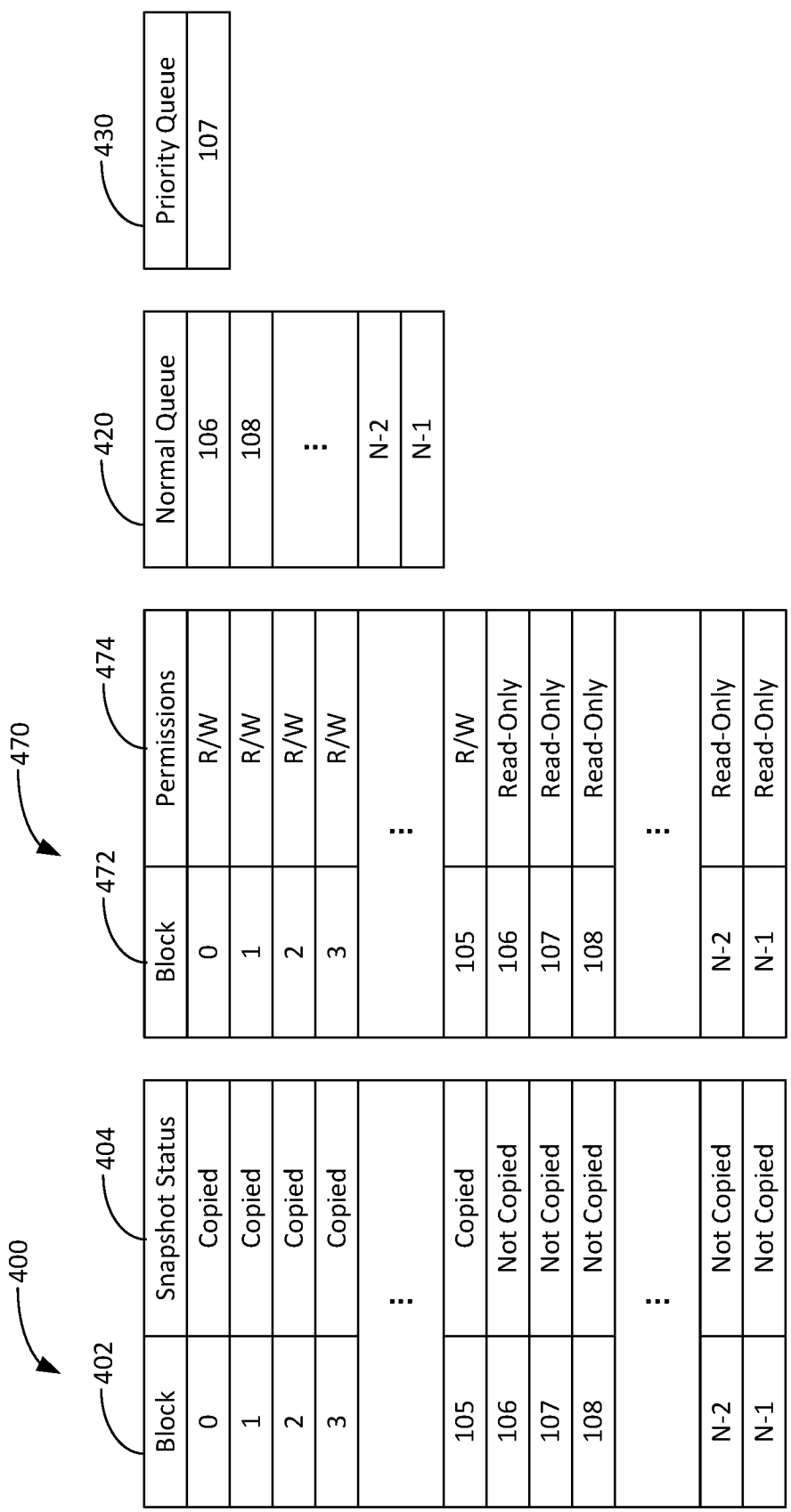

FIG. 4C illustrates a state in virtual computing environment 100 during the snapshot operation. As shown, blocks 0 thru 105 have been copied to the outstanding virtual memory snapshot 242. Accordingly, the identifies for those blocks are no longer in normal queue 420, their permissions have been restored to read-write in table 470, and their snapshot status column 404 are shown as copied.

Because the virtual machine 120 is not paused, during the snapshot operation, an operation to modify (e.g., to write to)

a block can be received by hypervisor 130. For example, emulator 134 can receive a write request or operation, issued by virtual machine software 128, for a block in virtual memory, and that block either has been copied or is not yet copied to the outstanding virtual memory snapshot 242. If the write request or operation is for a block that has been already copied to the outstanding virtual memory snapshot 242, then the request or operation can be applied according to the current permission of the block (e.g., the permission as indicated in table 470). For example, a write request to write to blocks 0-3 can be applied as normal according to the permissions of blocks 0-3 indicated in table 470.

If the write request or operation is for a block that has not been copied yet to the outstanding virtual memory snapshot 242, then emulator 134 can withhold the write request or operation from being applied before the block is copied (e.g., enqueue the write request to a queue for operations on hold, trap the write request). Snapshotting application 132 can remove the identifier for the block from normal queue 420 and enqueue the identifier for the block into priority queue 430. For example, as shown in FIG. 4C, a write request has been received for block 107, which has not been copied to the outstanding virtual memory snapshot 242 yet. In response to the write request, snapshotting application 132 removes the identifier for block 107 from normal queue 420 and enqueues the identifier for block 107 into priority queue 430.

Figure 4D:
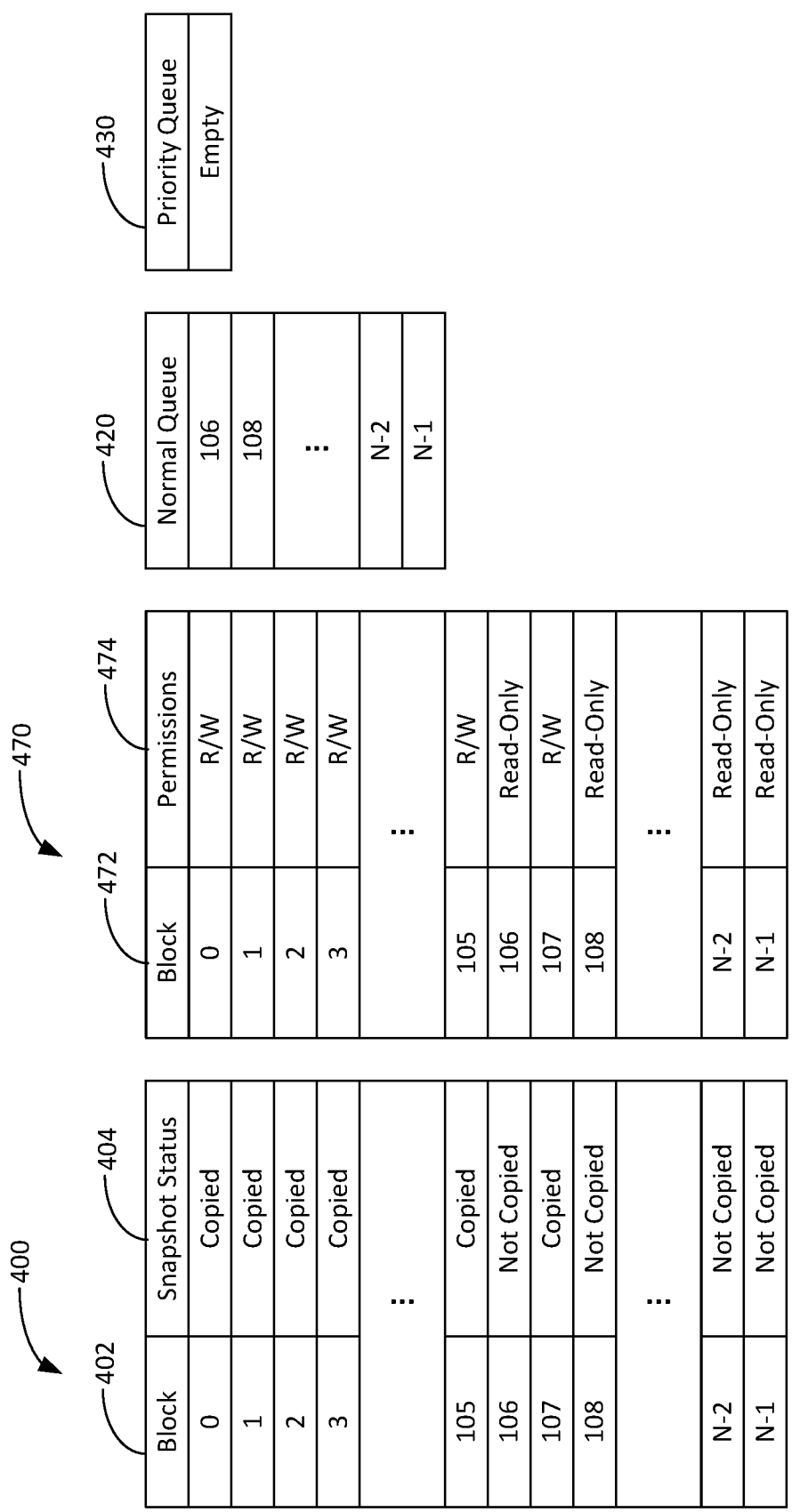
Figure 4E:
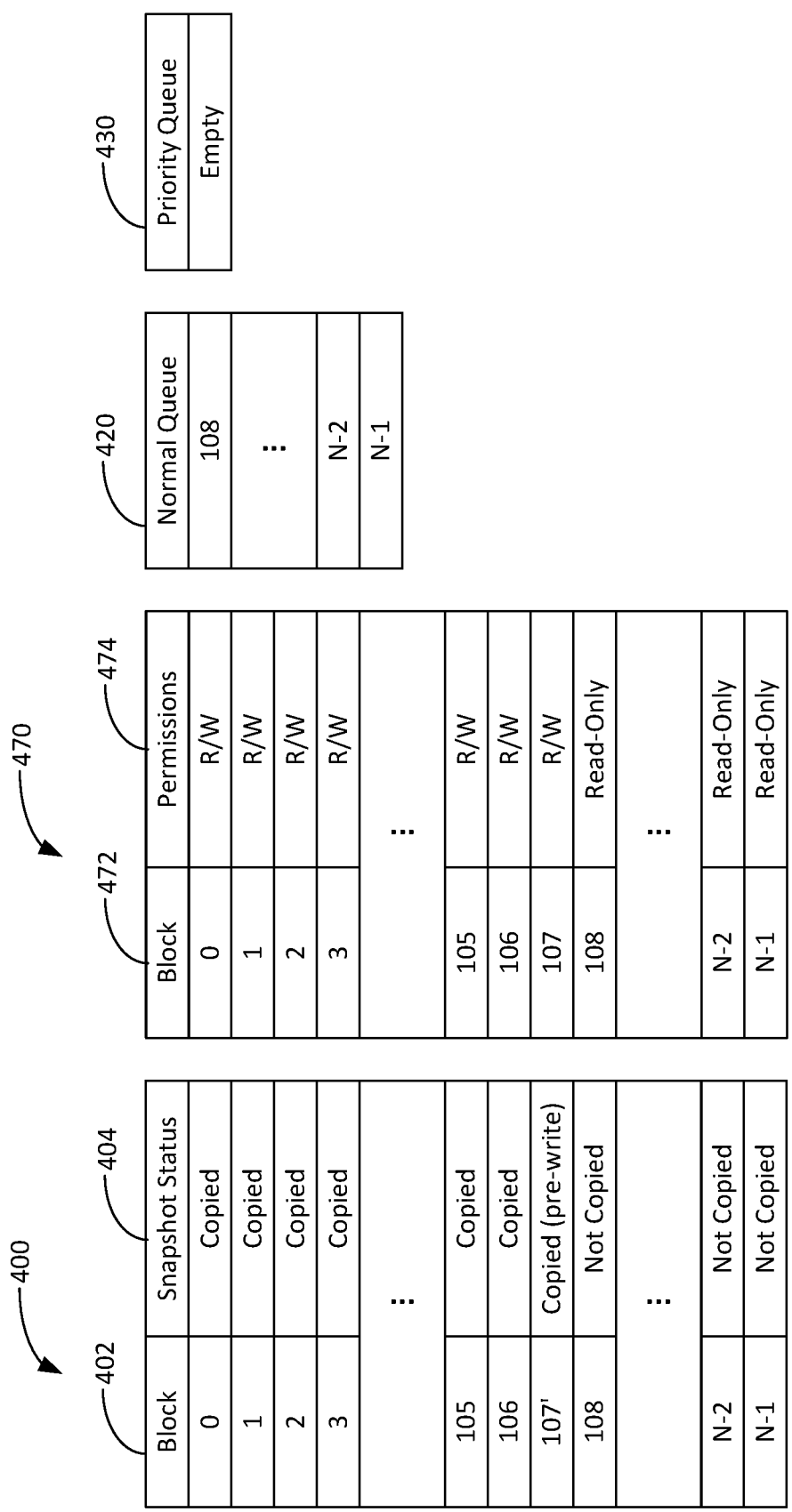

When priority queue 430 is non-empty, snapshotting application 132 can pause copying blocks in normal queue 420 to the outstanding virtual memory snapshot 242, and instead copy blocks in priority queue 430 to the outstanding virtual memory snapshot 242 until priority queue 430 is empty again. Accordingly, with the identifier for block 107 in priority queue 430, snapshotting application 132 can proceed to copy block 107 according to priority queue 430. As shown in FIG. 4D, after block 107 is copied to the outstanding virtual memory snapshot 242, the identifier for block 107 is no longer in priority queue 430, block 107 has a copied status, and the permissions of block 107 are restored. With block 107 copied and its permissions restored, the write request for block 107 can be applied. For example, in FIG. 4E, table 400 indicates a post-write block 107' after the write is applied, and that pre-write block 107 has been copied to virtual memory snapshot 242. Further, if priority queue 430 is empty, snapshotting application 132 can resume copying blocks according to normal queue 420. As shown in FIG. 4E, after resumption of copying of blocks according to normal queue 420, the identifier for block 106 has been dequeued from normal queue 420 and block 106 has been copied to virtual memory snapshot 242.

It should be appreciated that the snapshot progress information and corresponding data structures illustrated in FIGS. 4A-4E are merely exemplary, and the progress of a snapshot operation can be tracked or monitored with more or less, and/or different, data structures that those shown in FIGS. 4A-4E. For example, there need not be an actual table 400; the information in table 400 can be tracked indirectly based on whether an identifier for a block has been queued in normal queue 420 or priority queue 430 for copying to an outstanding virtual memory snapshot 242.

Figure 5A:
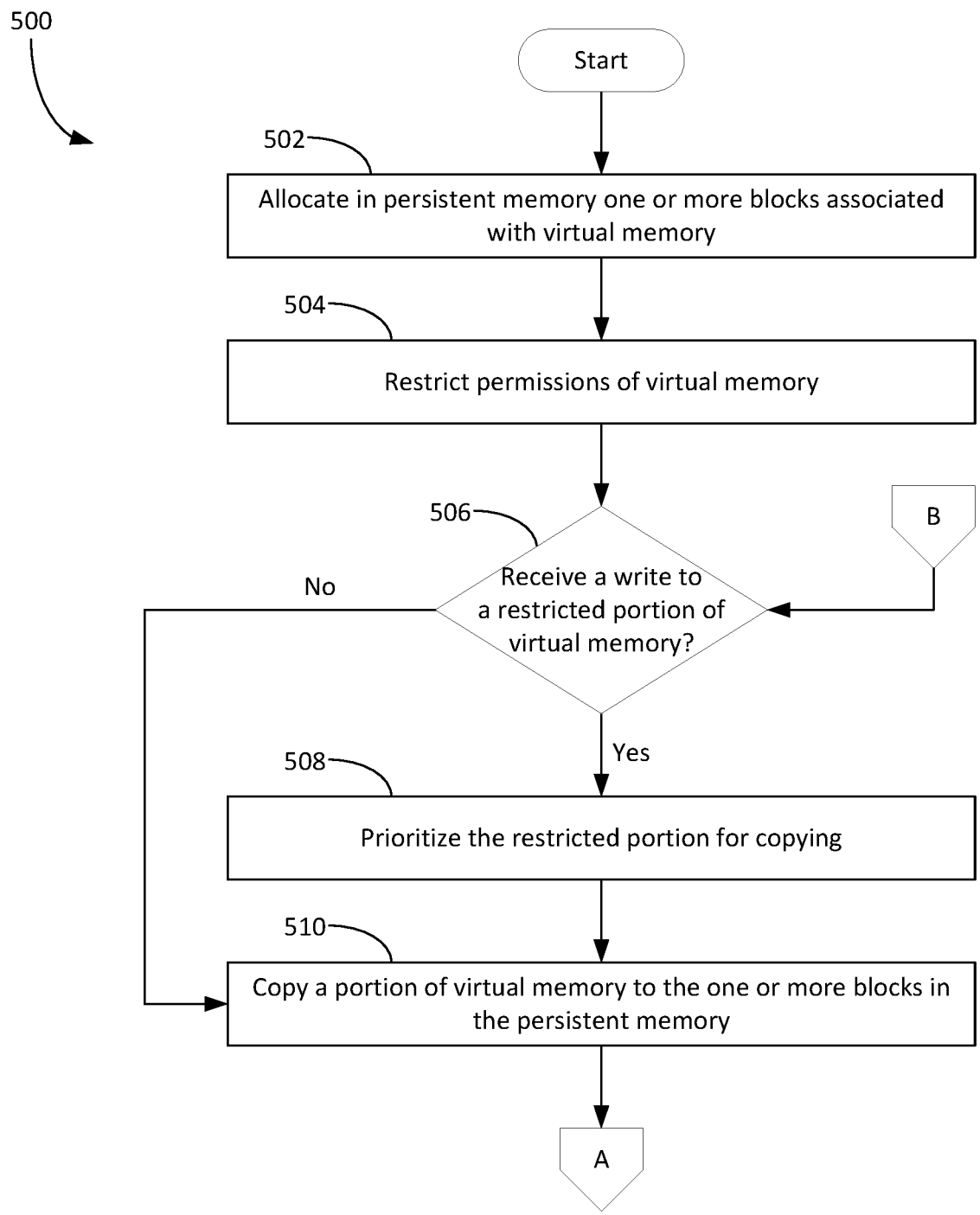
FIGS. 5A-5B is another flow chart of method steps for taking a snapshot of a virtual memory of a virtual machine, according to various embodiments of the present disclosure.
Figure 5B:
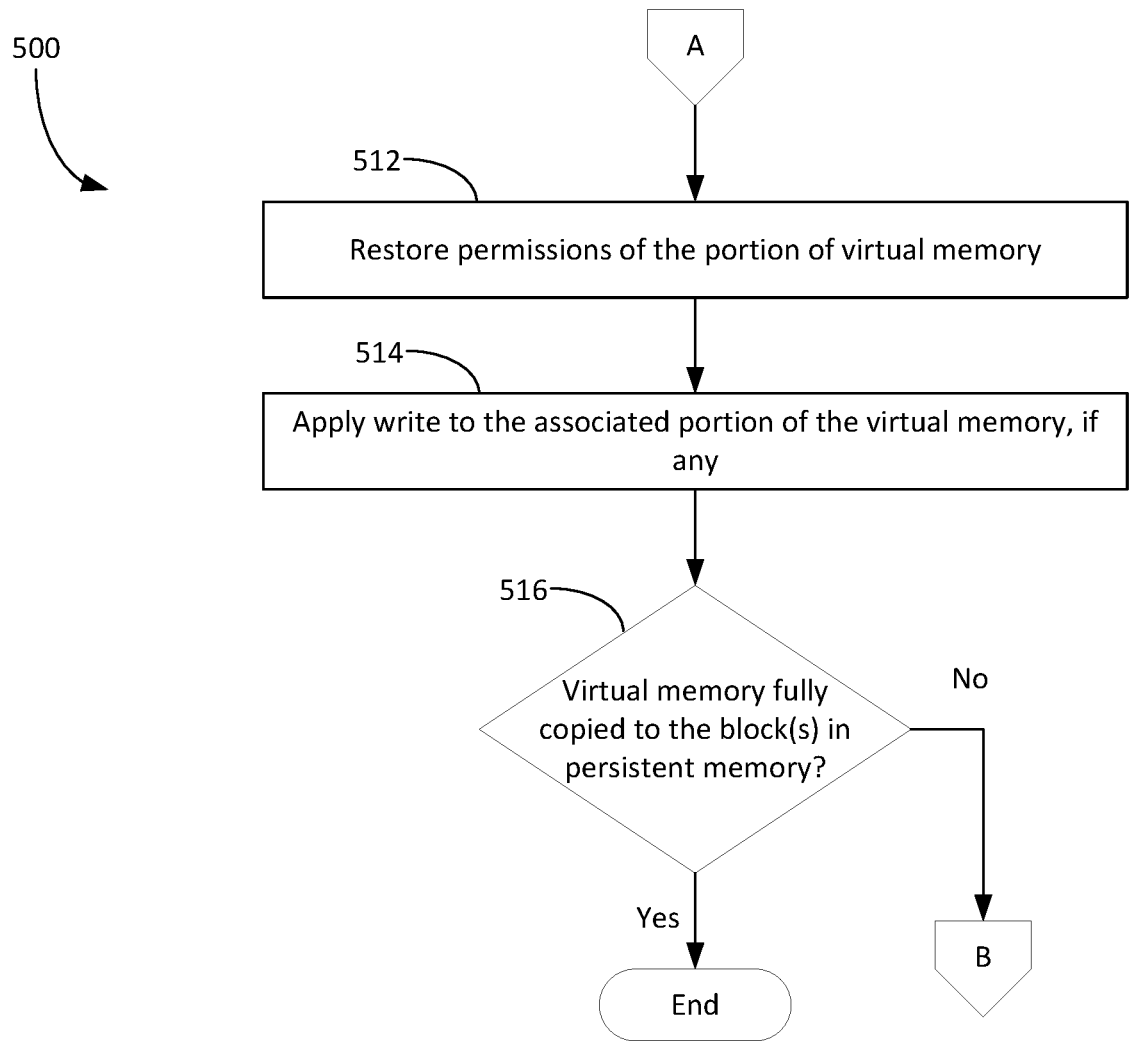

FIGS. 5A-5B include another flow chart of method steps for taking a snapshot of a virtual memory of a virtual machine, according to various embodiments of the present disclosure. Although the method steps are described with respect to the systems of FIGS. 1-2, 4A-4E, and FIGS. 10A-11, persons skilled in the art will understand that any system configured to perform the method steps, in any order, falls within the scope of the various embodiments.

As shown, a method 500 begins at step 502, where a snapshotting application 132 allocates one or more blocks in persistent memory 140. Step 502 is similar to step 302 in method 300.

At step 504, the snapshotting application restricts permissions of the virtual memory. Snapshotting application 132 modifies or otherwise restricts the permissions of virtual memory 122 to read-only permissions or other similar permission where modification is prohibited. In some embodiments, snapshotting application 132 modifies or restricts per-portion (e.g., per-block or per-page) permissions of virtual memory 122. If a permission for virtual memory 122 or for a given portion therein is already read-only, then the permission can be left unchanged. The snapshotting application can also save the permissions that were in effect prior to the modification or restriction of the permissions, so that the prior permissions can be restored later (e.g., in step 512). Those saved permissions can be stored in a memory or storage medium (e.g., in primary memory 110, persistent memory 140, and/or in storage 150). In some embodiments, snapshotting application 132 restricts the permissions by modifying permission parameters recorded in extended page tables (EPTs) associated with virtual memory 122 (e.g., marking virtual memory 122 or portions thereof as recorded in the EPTs as read-only). For example, as shown in FIG. 4B, permission column 474 of the blocks of virtual memory 122 in table 470 are modified to read-only.

At step 506, snapshotting application 132 determines whether a request to write data to a portion of virtual memory 122 whose permission is restricted (and thus has yet to be copied to the snapshot file) has been received from virtual machine software 128. If such a write request has not been received, then method 500 proceeds (506—No) to step 510, where snapshotting application 132 copies a portion of the virtual memory to the one or more blocks in the persistent memory allocated to virtual memory snapshot 242. For example, the identifier for the block could be dequeued from normal queue 420, and the block copied to virtual memory snapshot 242. Step 510 is similar to step 306 in method 300, where in step 510 specifically a portion of virtual memory 122 is being copied to virtual memory snapshot 242 in persistent memory 140. The portion being copied can be a block of virtual memory 122. In method 500, virtual memory 122 is copied portion-by-portion (e.g., block-by-block) to the snapshot file in persistent memory 140. The identifiers for the portions of virtual memory 122 can be queued for copying in a predefined order (e.g., an address order from lowest address to highest, or vice versa) or in a random order. In some embodiments, snapshotting application 132 copies the portion of virtual memory 122 as stored in PM portion 212 into persistent memory 140.

For example, as shown in FIGS. 4B-4C, identifiers for blocks of virtual memory 122 are queued in normal queue 420 for copying the corresponding blocks to virtual memory snapshot 242. No writes were received for blocks 0-105, and thus those blocks were copied virtual memory snapshot 242 in their queue order in normal queue 420.

At step 506, if such a write request has been received (e.g., trapped or otherwise withheld by hypervisor 130 as a fault due to the restricted permissions set in step 504), then method 500 proceeds (506—Yes) to step 508, where snapshotting application 132 prioritizes, for copying to the one or more allocated blocks in persistent memory, the restricted portion of virtual memory 122 to which the write request will write data. Hypervisor 130 can trap the write request and hold the write from being applied to the portion of virtual memory 122, and snapshotting application 132 can change the priority of the portion for copying to the highest priority (e.g., by making the portion the next to be copied, by placing the portion in a queue of portions to copied before other portions of virtual memory 122). In some embodiments, the restricted portion is prioritized by putting the portion in a priority queue for higher-priority copying. For example, in FIG. 4C, block 107, for which a write has been received, the identifier for block 107 is removed from normal queue 420 and enqueued into priority queue 430. Method 500 then proceeds to step 510, where snapshotting application 132 copies a portion of the virtual memory to the one or more allocated blocks in the persistent memory. As with step 510 following step 506-No described above, snapshotting application 132 copies a portion of virtual memory 122, as stored in primary memory 110, into virtual memory snapshot 242 in persistent memory 140, with the difference here being that the portion being copied is the portion that is prioritized (e.g., queued in priority queue 430) in step 508 as opposed to the next portion to be copied based on the predefined order (e.g., according to normal queue 420).

At step 512, the snapshotting application restores the permissions of the copied portion of the virtual memory. For whatever portion of virtual memory 122 was copied to the snapshot file in persistent memory 140, snapshotting application 132 restores the permissions of the portion that was in effect prior to the restrictions placed on the portion in step 504. In some embodiments, snapshotting application 132 restores the permissions by modifying a permission recorded in an EPT associated with the portion to the previous, pre-restriction permission. For example, in table 470, the permissions of copied blocks are restored to read-write, where those permissions had been changed to read-only for the snapshot operation.

At step 514, the snapshotting application applies the requested write to the portion of the virtual memory, if a write was determined to be received in step 506. If a write request was received for the portion that was copied, then the write can be applied to the portion in virtual memory 122. For example, as shown in FIGS. 4C-4E, after block 107 is copied to virtual memory snapshot 242 and the permission for block 107 is restored to the prior permission, the write is applied to modify block 107 to block 107'. If a write request for the portion was not received, then method 500 can proceed to step 516.

At step 516, snapshotting application 132 determines whether the virtual memory has been fully copied to the persistent memory. If virtual memory 122 has been fully copied to virtual memory snapshot 242 in persistent memory 140, then method 500 ends (516—Yes). If there are portions of virtual memory 122 that has yet to be copied to the snapshot file in persistent memory 140, then method 500 proceeds (516—No) back to step 506. In some embodiments, after method 500 ends, virtual memory snapshot 242 in persistent memory 140 can be moved to storage 150 as virtual memory snapshot 252. After virtual memory snapshot 242 is moved to storage 150, snapshotting application 132 can deallocate the allocated blocks in persistent memory 140 holding virtual memory snapshot 242. Those deallocated blocks can then be reallocated (e.g., to a subsequent virtual memory snapshot 242). Method 500 can be performed again to take a new snapshot of virtual memory 122.

FIGS. 6A-6D are diagrams illustrating another example snapshot progress information associated with a snapshot operation, according to various embodiments of the present disclosure. FIGS. 6A-6D illustrate another technique for taking a snapshot of virtual memory 122 that forgoes pausing virtual machine 120.

Figure 6C:
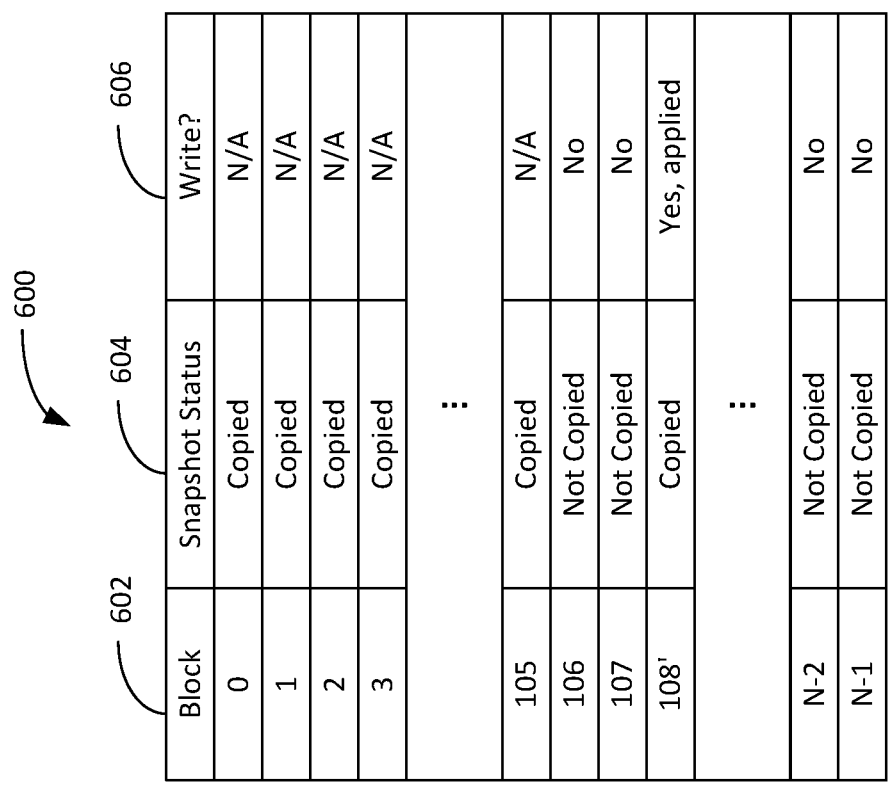

In FIG. 6A, a table 600 includes columns 602, 604, and 606. Column 602 indicates identifiers of addressable unit portions (e.g., addressable blocks, addressable pages, memory addresses) of virtual memory 122 (or, more particularly, identifiers of unit portions of PM portion 212 serving as virtual memory 122). As shown, virtual memory 122 includes N blocks, numbered from 0 to N−1 in FIGS. 6A-6D for simplicity and ease of understanding. In various implementations, the identifiers can be the addresses of the unit portions. Column 604 indicates a snapshot status of each block of virtual memory 122. The snapshot status of a block indicates whether the block has been copied into an outstanding virtual memory snapshot 242 in persistent memory 140. In some examples, the copied/not copied status of a block in column 604 can be recorded using a single bit. Table 600 also includes column 606, which indicates whether a write has been received for a block in a current snapshot operation. In some examples, the write received/not received status of a block in column 606 can be recorded using a single bit.

FIG. 6A corresponds to a state in virtual computing environment 100 prior to a snapshot operation (e.g., between snapshot operations). That is, a previous virtual memory snapshot 242 had already been completed, and a new virtual memory snapshot 242 has not been started. Accordingly, the blocks have a not-copied status as shown in table 600; none of the blocks have been copied to a new virtual memory snapshot 242 yet. Also, none of the blocks have an outstanding write request or operation during a snapshot operation. Snapshotting application 132 can initiate a snapshot operation to copy the blocks of virtual memory 122 to virtual memory snapshot 242 block-by-block. The blocks can be copied in a predefined order (e.g., ascending or descending address or identifier order) or in a random order. In some embodiments, the copying order can be managed via a queue similar to normal queue 420.

FIG. 6B corresponds to a state in virtual computing environment 100 during a snapshot operation that snapshotting application 132 has begun, and some blocks have been copied to virtual memory snapshot 242. As with FIGS. 4A-4E, snapshotting application 132 can copy virtual memory 122 to virtual memory snapshot 242 block-by-block. Different from FIGS. 4A-4E, however, is that the permissions of the blocks need not be changed to a read-only permission. As shown in FIG. 6B, for example, blocks 0-105 have been copied without any outstanding write request or operations for those blocks received during the snapshot operation. After those blocks have been copied, any write requests or operations for those copied blocks do not affect the consistency of the outstanding virtual memory snapshot 242, and thus those write requests or operations can be applied to the already-copied blocks. Accordingly, column 606 for those already-copied blocks indicate a not-applicable (N/A) status, indicating that the status of whether a write was received for those blocks is no longer applicable with respect to the consistency of those blocks for the current snapshot operation.

FIG. 6B also indicates that a write has been received for block 108 that has not been copied to virtual memory snapshot 242 yet. The write for block 108 is not applied yet to block 108, but is instead trapped by emulator 134 until after block 108 is copied to virtual memory snapshot 242. Snapshotting application 132 can pause copying of blocks based on the predefined order, and instead proceed to copy block 108 out-of-order. Thus, snapshotting application 132, instead of next copying block 106 in accordance with the original copying order, next copies block 108 to virtual memory snapshot 242 ahead of order. After block 108 is copied to virtual memory snapshot 242, the write request to block 108 is applied, and snapshotting application 132 can resume copying blocks based on the original copying order (e.g., in address or identifier order). FIG. 6C shows block 108 as having been copied and the write applied to modify block 108 to block 108'.

In FIG. 6D, snapshotting application 132 has resumed copying blocks based on the original copying order. Accordingly, snapshotting application 132 has copied block 106, which was the first not-copied block in the original copying order. The status for block 106 in column 604 is shown as copied.

It should be appreciated that the snapshot progress information and corresponding data structures illustrated in FIGS. 6A-6D are merely exemplary, and the progress of a snapshot operation can be tracked or monitored with more or less, and/or different, data structures that those shown in FIGS. 6A-6D.

Figure 7:
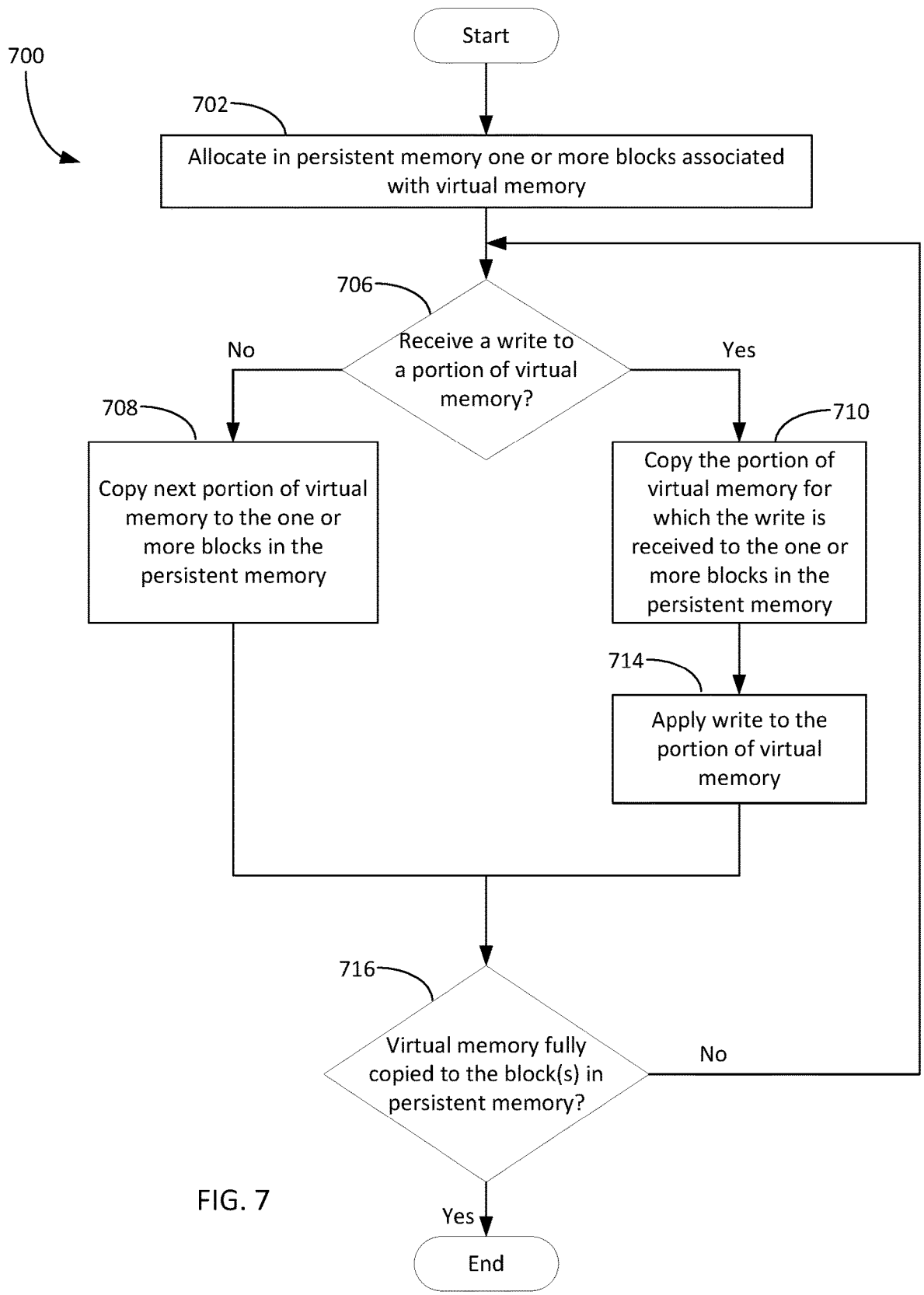
FIG. 7 is yet another flow chart of method steps for taking a snapshot of a virtual memory of a virtual machine, according to various embodiments of the present disclosure.

FIG. 7 includes yet another flow chart of method steps for taking a snapshot of a virtual memory of a virtual machine, according to various embodiments of the present disclosure. Although the method steps are described with respect to the systems of FIGS. 1-2, 6A-6D, and FIGS. 10A-11, persons skilled in the art will understand that any system configured to perform the method steps, in any order, falls within the scope of the various embodiments.

As shown, a method 700 begins at step 702, where a snapshotting application 132 allocates one or more blocks in persistent memory 140. Step 702 is similar to step 302 in method 300 or step 502 in method 500.

At step 706, snapshotting application 132 determines whether a request to write data to a portion of virtual memory 122 that has yet to be copied to the snapshot file has been received. Step 706 is similar to step 506 in method 500, with a difference being that, in method 700, permissions for virtual memory 122 and/or for portions thereof have not been restricted or otherwise modified as in step 504 in method 500. In some embodiments, snapshotting application 132, in conjunction with emulator 134, traps a received write request to a portion of virtual memory 122 that is not yet copied to virtual memory snapshot 242. If such a write request has not been received, then method 700 proceeds (706—No) to step 708, where snapshotting application 132 copies a portion of the virtual memory to virtual memory snapshot 242 in persistent memory 140. The portion that is copied can be a next portion according to a predefined order (e.g., address order). For example, FIG. 6B shows blocks 0-105 having a copied status, where those blocks had been copied to virtual memory snapshot 242 in the predefined order. Step 708 is similar to step 510 in method 500, in that a portion of virtual memory 122 is being copied to virtual memory snapshot 242 in persistent memory 140. Method 700 then proceeds to step 716.

At step 706, if such a write request has been received, then method 700 proceeds (706—Yes) to step 710, where snapshotting application 132 copies the portion of virtual memory 122 for which the write is requested to the one or more allocated blocks in the persistent memory. Hypervisor 130 (e.g., emulator 134) can trap the write and hold the write from being applied to the portion of virtual memory 122, and snapshotting application 132 can change the order of copying to put the portion for which the write request is received ahead of the remaining portions to be copied. In some embodiments, snapshotting application 132 pauses copying according to the original order (e.g., the predefined order) and proceeds to copy the portion for which the write is received ahead of order. For example, as shown in FIGS. 6B-6C, block 108, for which a write is received, is copied to virtual memory snapshot 242 ahead of block 106, even though block 106 would have been copied before block 108 in the original order. Snapshotting application 132 copies that portion to the allocated blocks (e.g., to virtual memory snapshot 242) in persistent memory 140. Accordingly, the copying aspect of step 710 is similar to that of step 708, with a difference being that in step 710 the portion for which the write request is received is copied out of the predefined order and ahead of remaining portions to be copied. From step 710, method 700 then proceeds to step 714.

In some embodiments, hypervisor 130 (e.g., emulator 134) traps writes by removing page tables (e.g., EPT 270) or otherwise disabling access to page tables or revoking permissions to access virtual memory 122.

At step 714, the snapshotting application applies the write corresponding to the write request that was determined to be received in step 706 to the portion of the virtual memory. Step 714 is similar to step 514 in method 500.

At step 716, snapshotting application 132 determines whether the virtual memory has been fully copied to the persistent memory. If virtual memory 122 has been fully copied to virtual memory snapshot 242 in persistent memory 140 (e.g., data at each memory address in virtual memory 122 has been copied), then method 700 ends. If there are portions of virtual memory 122 that has yet to be copied to the snapshot file in persistent memory 140, then method 700 proceeds back to step 706.

In some embodiments, after method 700 ends, virtual memory snapshot 242 in persistent memory 140 can be moved to storage 150 as virtual memory snapshot copy 252. After to virtual memory snapshot 242 is moved to storage 150, snapshotting application 132 can deallocate the allocated blocks in persistent memory 140 holding to virtual memory snapshot 242. Those deallocated blocks can then be reallocated (e.g., to a subsequent to virtual memory snapshot 242). Method 700 can be performed again to take a new snapshot of virtual memory 122.

FIGS. 8A-8D are diagrams illustrating another example snapshot progress information associated with a snapshot operation, according to various embodiments of the present disclosure. FIGS. 8A-8D illustrate another technique for taking a snapshot of virtual memory 122 that forgoes pausing virtual machine 120.

Figure 8A:
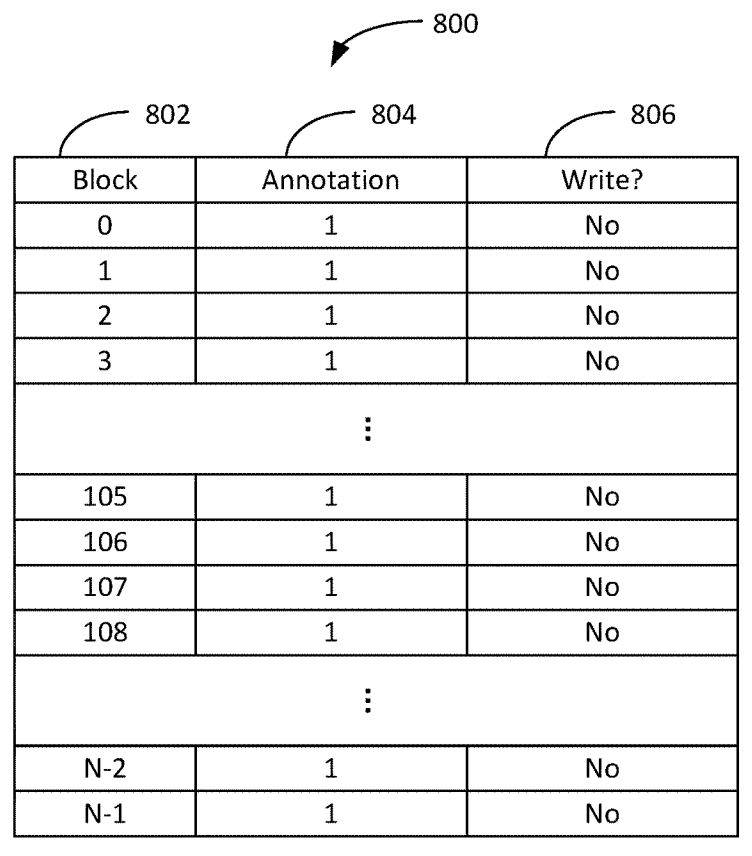
Figure 8B:
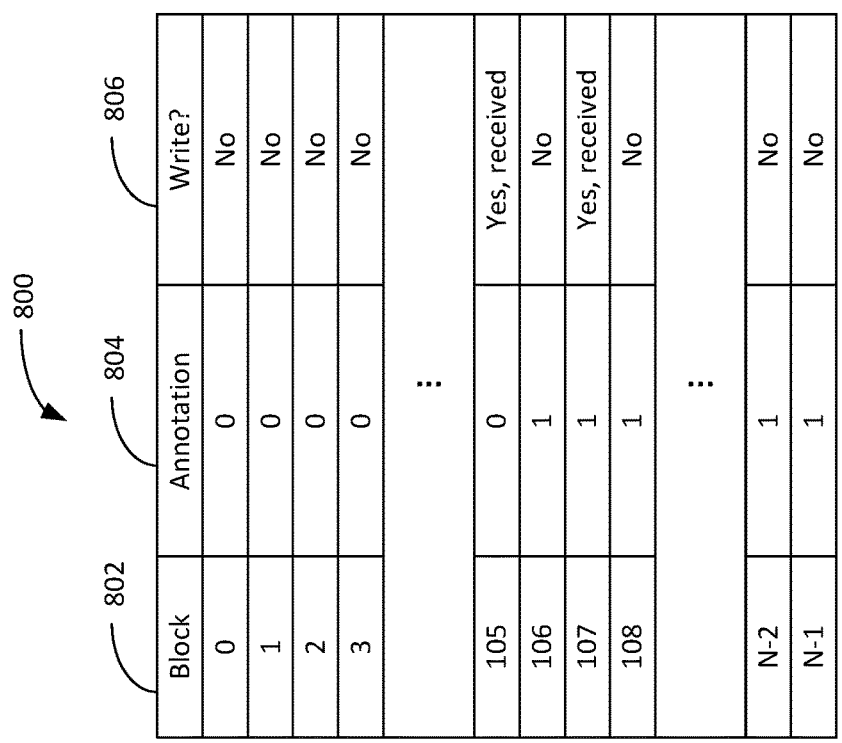

In FIG. 8A, a table 800 includes columns 802, 804, and 806. Column 802 indicates identifiers of addressable unit portions (e.g., addressable blocks, addressable pages, memory addresses) of virtual memory 122 (or, more particularly, identifiers of unit portions of PM portion 212 serving as virtual memory 122). As shown, virtual memory 122 includes N blocks, numbered from 0 to N−1 in FIGS. 8A-8D for simplicity and ease of understanding. In various implementations, the identifiers can be the addresses of the unit portions. Column 804 indicates an annotation of each block. In some embodiments, the annotation can be a single bit (e.g., a bit flag) of value 0 or 1. The annotation can be used to track a snapshot status of the corresponding block of virtual memory 122, details of which are described below. Table 800 also includes column 806, which indicates whether a write has been received for a block in a current snapshot operation. In some embodiments, column 806 is optional and can be omitted.

FIG. 8A corresponds to a state in virtual computing environment 100 in which snapshotting application 132 has initiated a snapshot operation but before copying any block. When initiating the snapshot operation, snapshotting application 132 annotates each block by setting the annotation of each block to 1, as shown in FIG. 8A. The value of 1 for the annotation indicates that the block is to be copied in the current snapshot operation to the outstanding virtual memory snapshot 242. Also, none of the blocks have an outstanding write request or operation yet in the current snapshot operation, as shown in FIG. 8A. Snapshotting application 132 can proceed to copy the blocks of virtual memory 122 to virtual memory snapshot 242 block-by-block. The blocks can be copied in a predefined order (e.g., ascending or descending address or identifier order) or in a random order.

FIG. 8B corresponds to a state in virtual computing environment 100 during a snapshot operation that snapshotting application 132 has begun, and some blocks have been copied to virtual memory snapshot 242. As with FIG. 4A-4E or 6A-6D, snapshotting application 132 can copy virtual memory 122 to virtual memory snapshot 242 block-by-block. In particular, snapshotting application 132 copies blocks whose annotation is 1 to virtual memory snapshot 242. Different from FIGS. 4A-4E, however, is that the permissions of the blocks need not be changed to a read-only permission. As shown in FIG. 8B, for example, blocks 0-105 have been copied. For each copied block, snapshotting application 132 un-annotates the block by resetting the annotation of the copied block to 0. Accordingly, the annotation for blocks 0-105 is 0 as shown in column 804 in FIG. 8B.

Also shown in FIG. 8B is that respective write requests have been received for blocks 105 and 107 in the current snapshot operation. The write request for block 105 is received after block 105 was already copied and its annotation was reset to 0, and the write request for block 107 is received before block 107 is copied (and accordingly while its annotation is still 1).

Figure 8C:
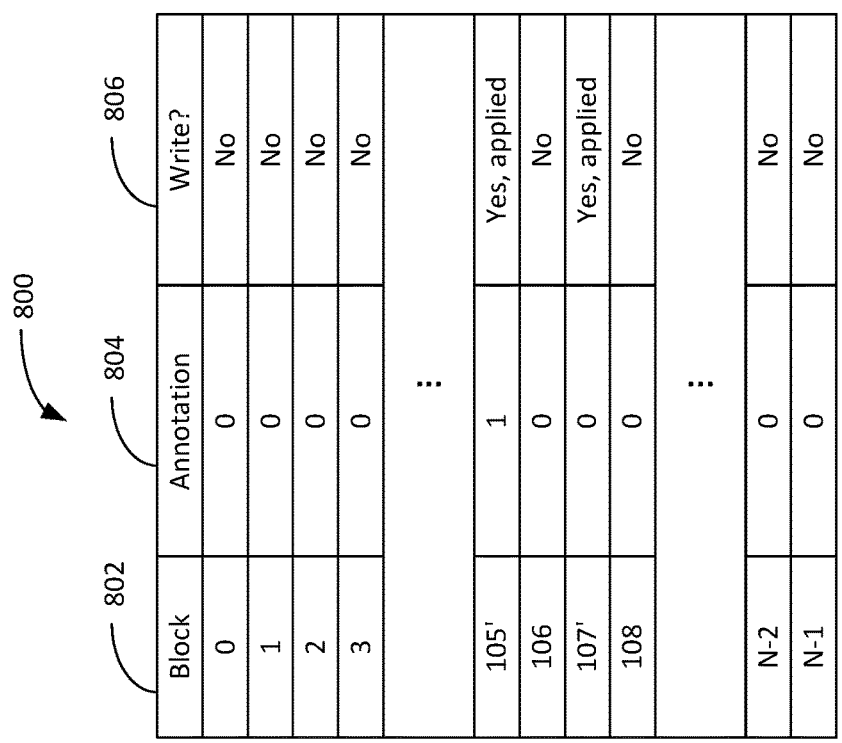

The write requests are applied without regard to whether the block has been copied or not. Accordingly, FIG. 6C shows the table 800 after the write requests are applied to blocks 105 and 107 respectively. Table 800 now shows blocks 105' and 107' to indicate that those blocks have been modified by respective write requests. If a write request is applied to a block whose annotation is 1, then that block can be copied to virtual memory snapshot 242, and its annotation reset to 0, in the normal order for that block; the block as modified by the write request is copied to virtual memory snapshot 242. If a write request is applied to a block whose annotation is 0, then the annotation for that block is set to 1 again after the write request is applied, so that the block can be copied to virtual memory snapshot 242 again during a later portion of the current snapshot operation. Accordingly, FIG. 8C shows the annotation for block 105' set to 1, and the annotation for block 107' set to 0, indicating that block 107' has been copied to virtual memory snapshot 242 after the write to block 107 and that block 105' is to be copied to virtual memory snapshot 242 to update the copy of block 105 in virtual memory snapshot 242 due to the write to block 105 after block 105 was copied to virtual memory snapshot 242. FIG. 8C also shows that blocks 106 and 108 thru N-1 have been copied and their annotations reset to 0. Accordingly, FIG. 8C shows that blocks 0-105, 106, 107', and 108-(N-1) have been copied to virtual memory snapshot 242, and block 105' is to be copied to virtual memory snapshot 242 in a later portion of the current snapshot operation.

FIG. 8D shows table 800 after snapshotting application 132 has copied block 105' to virtual memory snapshot 242. The annotation of block 105' has been reset to 0. With the annotations of blocks 0-(N-1) being 0, the snapshot operation for the outstanding virtual memory snapshot 242 is complete.

It should be appreciated that the snapshot progress information and corresponding data structures illustrated in FIGS. 8A-8D are merely exemplary, and the progress of a snapshot operation can be tracked or monitored with more or less, and/or different, data structures that those shown in FIGS. 8A-8D.

Figure 9A:
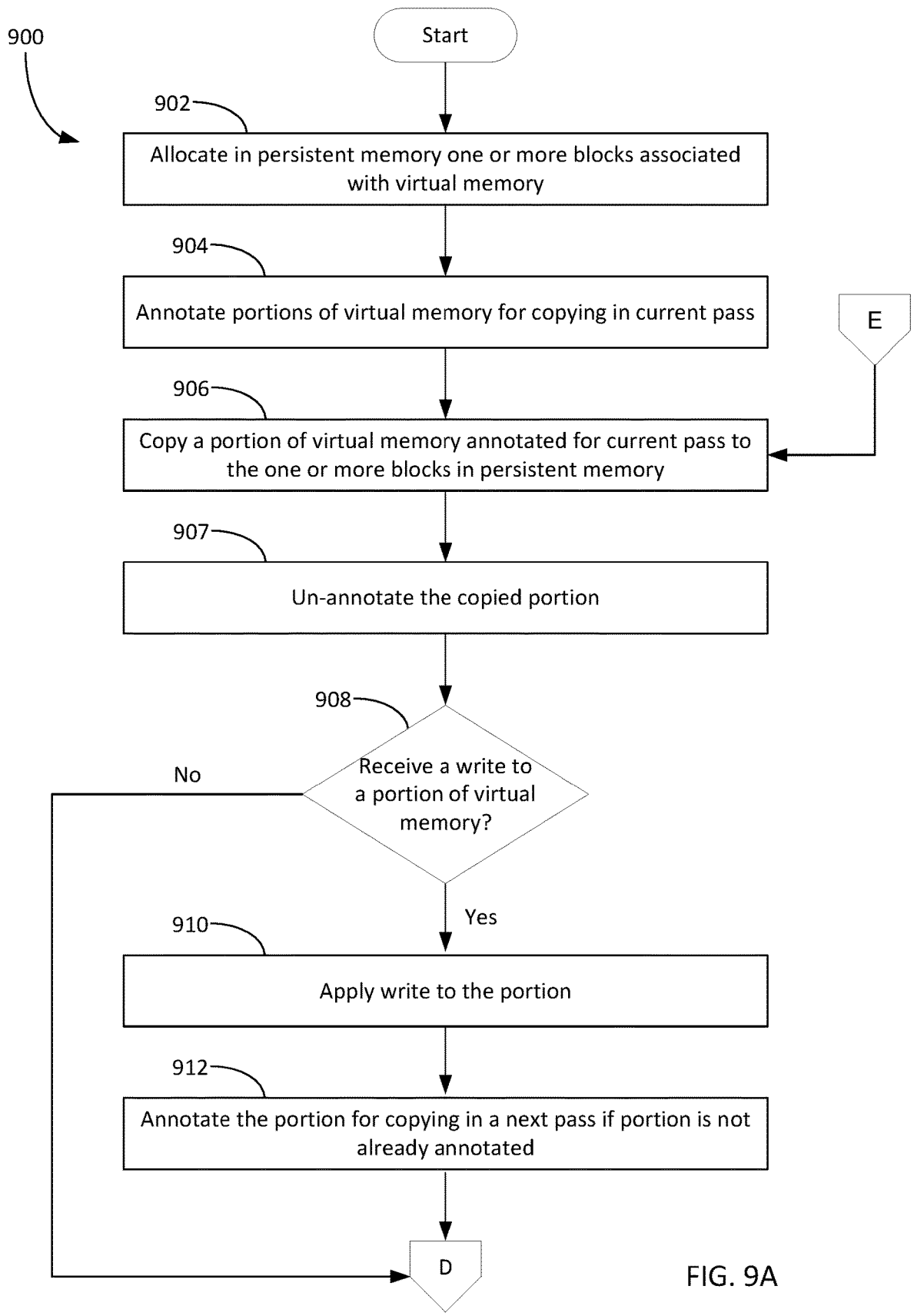
FIGS. 9A-9B is a further flow chart of method steps for taking a snapshot of a virtual memory of a virtual machine, according to various embodiments of the present disclosure.
Figure 9B:
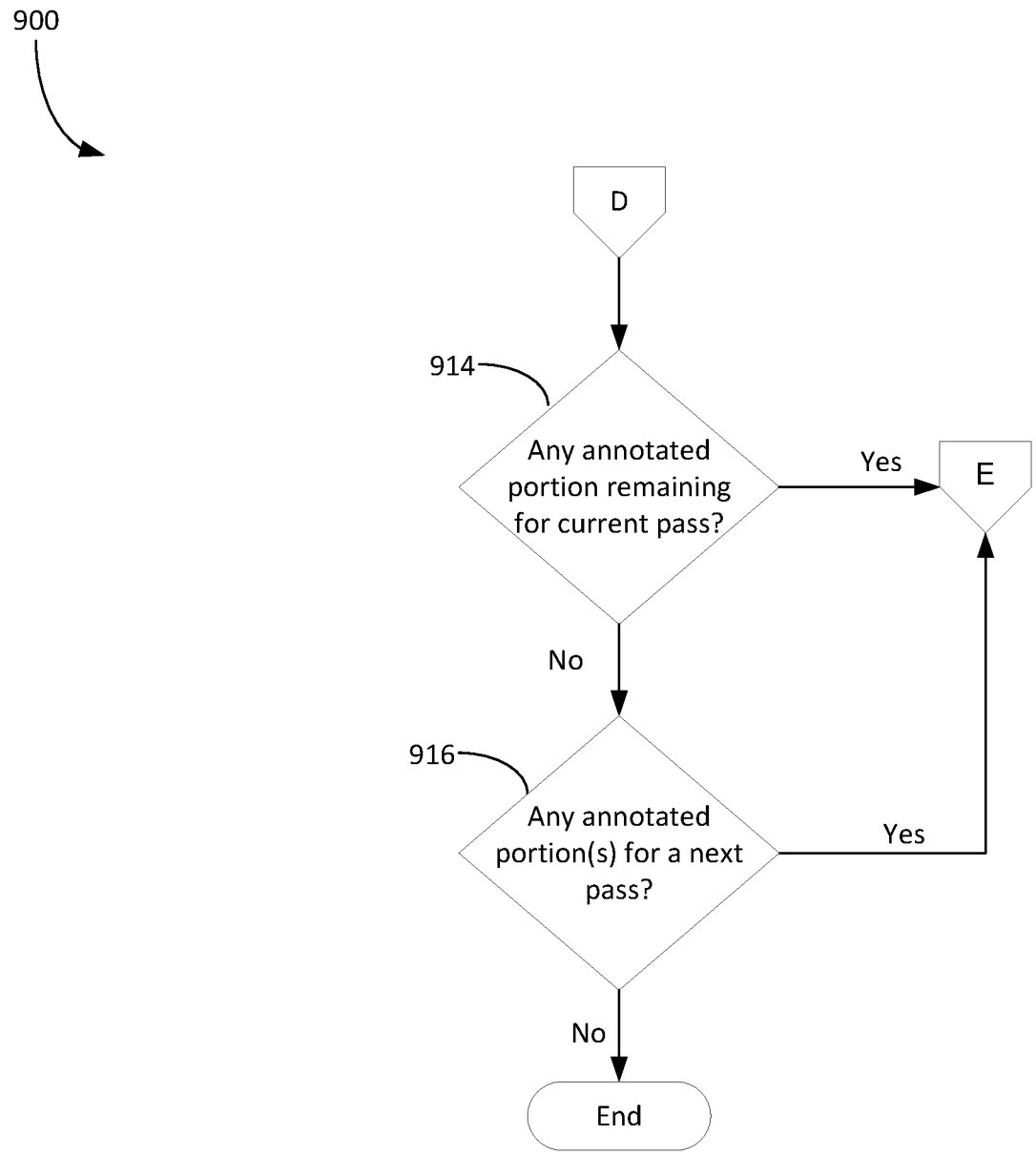

FIGS. 9A-9B include yet another a further flow chart of method steps for taking a snapshot of a virtual memory of a virtual machine, according to various embodiments of the present disclosure. Although the method steps are described with respect to the systems of FIGS. 1-2 and FIGS. 10A-11, persons skilled in the art will understand that any system configured to perform the method steps, in any order, falls within the scope of the various embodiments.

As shown, a method 900 begins at step 902, where a snapshotting application 132 allocates one or more blocks in persistent memory 140. Step 902 is similar to step 302 in method 300, step 502 in method 500, or step 702 in method 700.

At step 904, the snapshotting application annotates portions of virtual memory 122 for copying. Snapshotting application 132 annotates each portion (e.g., each memory address) of virtual memory as a portion to be copied to virtual memory snapshot 242 in persistent memory 140. For example, as shown in FIG. 8A, the annotations for the blocks in table 800 are set to 1. In some embodiments, the annotation includes an indication of a pass of the current snapshot operation in which the portion is to be copied. Accordingly, for a first pass to take a snapshot of virtual memory 122, each portion of virtual memory 122 can be annotated for the first pass and are copied in the first pass. As described below, portions to which writes are applied can be annotated for copying in a second or subsequent pass.

At step 906, snapshotting application 132 copies an annotated portion of the virtual memory to the one or more allocated blocks in the persistent memory. Step 906 is similar to step 510 or 708 described above. Snapshotting application 132 can copy a portion that is annotation for the current pass (e.g., a block whose annotation is currently set to 1). In some embodiments, snapshotting application 132 copies annotated portions in a predefined order (e.g., in ascending or descending address or identifier order). For example, as described above with reference to FIG. 8B, snapshotting application 132 has so far copied blocks 0-105 according to a predefined order.

At step 907, snapshotting application 132 un-annotates the portion that is copied in step 906. With the portion being un-annotated, the portion need not be copied again in subsequent passes unless the portion is written to after being copied, as described below. For example, as shown in FIG. 8B, the annotations of copied blocks 0-105 have been reset to 0.

At step 908, snapshotting application 132 determines whether a request to write data to a portion of virtual memory 122 has been received from virtual machine software 128. If such a write request has not been received, then method 900 proceeds (908—No) to step 914.

At step 908, if such a write request has been received, then method 900 proceeds (908—Yes) to step 910, where snapshotting application 132 applies the write to the portion of virtual memory 122 for which the write request is received. For example, as shown in FIG. 8B-8C, write requests have been received for blocks 105 and 107 and have been applied to those blocks, modifying those blocks to blocks 105' and 107', respectively.

At step 912, snapshotting application 132 annotates the portion to which the write was applied for copying to virtual memory snapshot 242 in a next pass in the snapshot operation, if the portion is not already annotated. The annotation is similar to that made in step 904, with the annotation made in step 912 indicating that the portion is to be copied to persistent memory 140 again in a next pass. For example, as shown in FIG. 8C, the annotation for block 105' has been set to 1, indicating that block 105' is to be copied to virtual memory snapshot 242. If the portion is already annotated (e.g., the portion still has the annotation made in step 904, or the portion has an annotation resulting from a prior write), the portion need not be annotated again. For example, as shown in FIG. 8B, the annotation for block 107' remains at 1 because block 107' has yet to be copied to virtual memory snapshot 242 when the write request was applied. Method 900 then proceeds to step 914.

At step 914, snapshotting application 132 determines whether there are any portions annotated for the current pass that remain to be copied. If there are portions annotated for the current pass that has yet to be copied in the current pass, then method 900 proceeds (914—Yes) back to step 906, where snapshotting application 132 can copy another portion annotated for the current pass. For example, in FIGS. 8B-8C, after writing block 107', snapshotting application 132 further proceeds to copy blocks 108-(N−1) in order.

If there are no more portions annotated for copying in the current pass and has yet to be copied in the current pass, then method 900 proceeds (914—No) to step 916, where snapshotting application 132 determines whether there are any portions annotated (e.g., blocks whose annotation is set again to 1) for a next pass. If there are no portions annotated for a next pass, such as is shown in FIG. 8D, then method 900 ends (916—No). If there are one or more portions annotated for the next pass, then method 900 proceeds (916—Yes) to step 906 and advances to the next pass, where snapshotting application 132 can copy a portion annotated for the next, now current, pass to virtual memory snapshot 242 in persistent memory 140. For example, as shown in FIG. 8C, snapshotting application 132 can proceed with another pass to copy block 105', whose annotation was set again to 1, to virtual memory snapshot 242 in that another pass.

In some embodiments, after method 900 ends, virtual memory snapshot 242 in persistent memory 140 can be moved to storage 150 as virtual memory snapshot copy 252. After virtual memory snapshot 242 is moved to storage 150, snapshotting application 132 can deallocate the allocated blocks in persistent memory 140 holding virtual memory snapshot 242. Those deallocated blocks can then be reallocated (e.g., to a subsequent virtual memory snapshot 242). Method 900 can be performed again to take a new snapshot of virtual memory 122.

As described above, methods 500, 700, or 900 can be performed to take a snapshot of virtual memory 122 without pausing virtual machine 120. In methods 500 or 700, the snapshot is a pre-write snapshot. That is, write requests or operations received after the snapshot operation has been initiated (e.g., received while the snapshot operation is in progress) are not accounted for in the outstanding snapshot, but is accounted for in the subsequent snapshot. The data captured in the snapshot is consistent with the contents of virtual memory 122 prior to initiation of the snapshot operation. In method 900, the snapshot is a post-write snapshot. That is, write requests or operations received after the snapshot operation has been initiated (e.g., received while the snapshot operation is in progress) are accounted for in the outstanding snapshot. The data captured in the snapshot is consistent with the contents of virtual memory 122 at completion of the snapshot operation.

Exemplary Virtualization System Architectures

According to some embodiments, all or portions of any of the foregoing techniques described with respect to FIGS. 1-9B can be partitioned into one or more modules and instanced within, or as, or in conjunction with a virtualized controller in a virtual computing environment. Some example instances within various virtual computing environments are shown and discussed in further detail in FIGS. 10A-10D. Consistent with these embodiments, a virtualized controller includes a collection of software instructions that serve to abstract details of underlying hardware or software components from one or more higher-level processing entities. In some embodiments, a virtualized controller can be implemented as a virtual machine, as an executable container, or within a layer (e.g., such as a layer in a hypervisor). Consistent with these embodiments, distributed systems include collections of interconnected components that are designed for, or dedicated to, storage operations as well as being designed for, or dedicated to, computing and/or networking operations.

In some embodiments, interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

In some embodiments, a hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

In some embodiments, physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

Figure 10A:
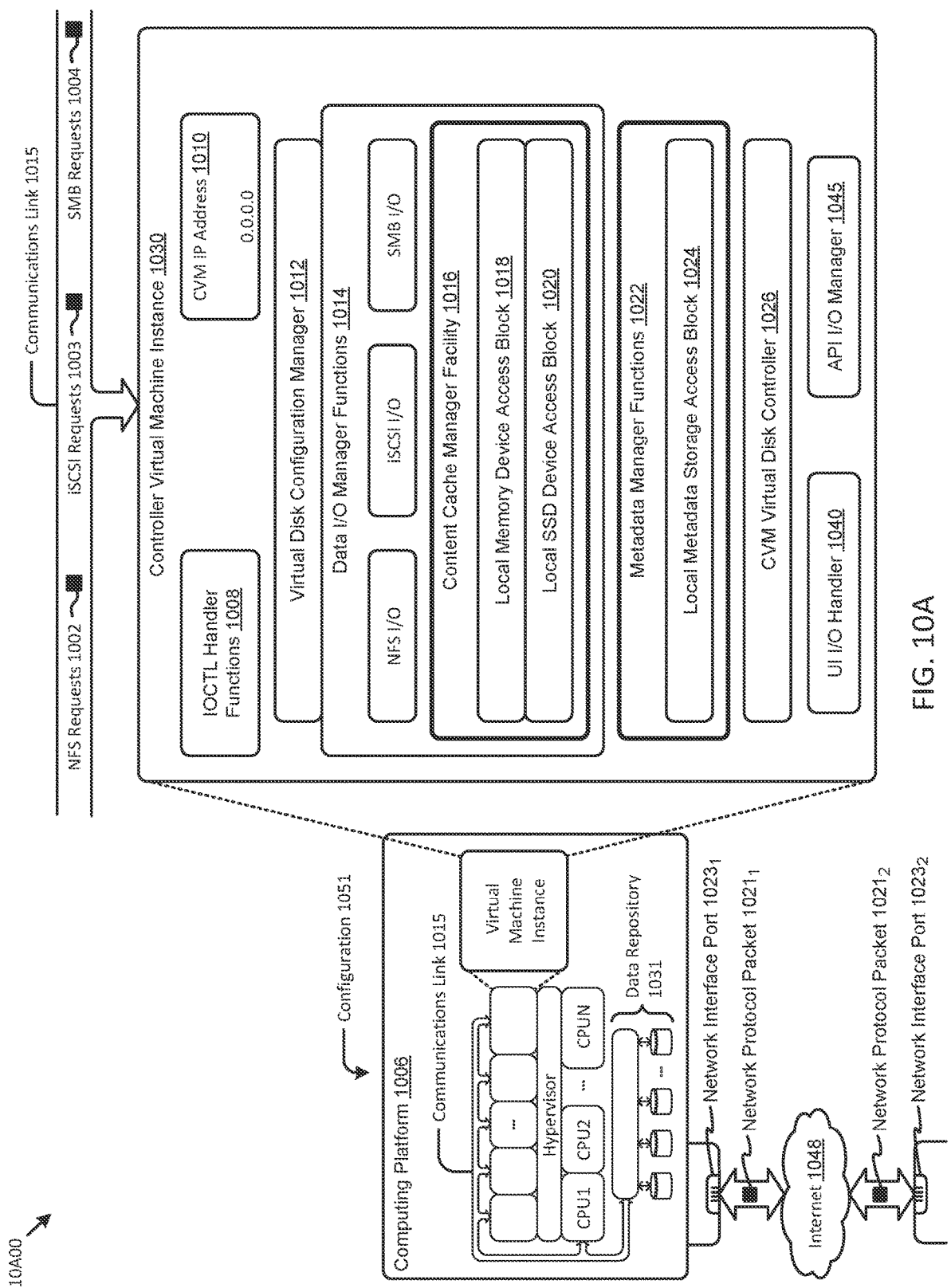
FIGS. 10A-10D are block diagrams illustrating virtualization system architectures configured to implement one or more aspects of the present disclosure.

FIG. 10A is a block diagram illustrating virtualization system architecture 10A00 configured to implement one or more aspects of the present embodiments. As shown in FIG. 10A, virtualization system architecture 10A00 includes a collection of interconnected components, including a controller virtual machine (CVM) instance 1030 in a configuration 1051. Configuration 1051 includes a computing platform 1006 that supports virtual machine instances that are deployed as user virtual machines, or controller virtual machines or both. Such virtual machines interface with a hypervisor (as shown). In some examples, virtual machines may include processing of storage I/O (input/output or IO) as received from any or every source within the computing platform. An example implementation of such a virtual machine that processes storage I/O is depicted as CVM instance 1030.

In this and other configurations, a CVM instance receives block I/O storage requests as network file system (NFS) requests in the form of NFS requests 1002, internet small computer storage interface (iSCSI) block IO requests in the form of iSCSI requests 1003, Samba file system (SMB) requests in the form of SMB requests 1004, and/or the like. The CVM instance publishes and responds to an internet protocol (IP) address (e.g., CVM IP address 1010). Various forms of input and output can be handled by one or more IO control handler functions (e.g., IOCTL handler functions 1008) that interface to other functions such as data IO manager functions 1014 and/or metadata manager functions 1022. As shown, the data IO manager functions can include communication with virtual disk configuration manager 1012 and/or can include direct or indirect communication with any of various block IO functions (e.g., NFS IO, iSCSI IO, SMB IO, etc.).

In addition to block IO functions, configuration 1051 supports IO of any form (e.g., block IO, streaming IO, packet-based IO, HTTP traffic, etc.) through either or both of a user interface (UI) handler such as UI IO handler 1040 and/or through any of a range of application programming interfaces (APIs), possibly through API IO manager 1045.

Communications link 1015 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), formatting of bit fields into fixed-length blocks or into variable length fields used to populate the payload, and/or the like. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

Computing platform 1006 include one or more computer readable media that is capable of providing instructions to a data processor for execution. In some examples, each of the computer readable media may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random access persistent memories (RAPMs) or optical or magnetic media drives such as paper tape or magnetic tape drives. Volatile media includes dynamic memory such as random access memory (RAM). As shown, controller virtual machine instance 1030 includes content cache manager facility 1016 that accesses storage locations, possibly including local dynamic random access memory (DRAM) (e.g., through local memory device access block 1018) and/or possibly including accesses to local solid state storage (e.g., through local SSD device access block 1020).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 1031, which in turn can be formatted into any one or more storage areas, and which can comprise parameterized storage accessible by a key (e.g., a filename, a table name, a block address, an offset address, etc.). Data repository 1031 can store any forms of data, and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 1024. The data repository 1031 can be configured using CVM virtual disk controller 1026, which can in turn manage any number or any configuration of virtual disks.

Execution of a sequence of instructions to practice certain of the disclosed embodiments is performed by one or more instances of a software instruction processor, or a processing element such as a data processor, or such as a central processing unit (e.g., CPU1, CPU2, . . . , CPUN). According to certain embodiments of the disclosure, two or more instances of configuration 1051 can be coupled by communications link 1015 (e.g., backplane, LAN, PSTN, wired or wireless network, etc.) and each instance may perform respective portions of sequences of instructions as may be required to practice embodiments of the disclosure.

The shown computing platform 1006 is interconnected to the Internet 1048 through one or more network interface ports (e.g., network interface port $1023_1$ and network interface port $1023_2$). Configuration 1051 can be addressed through one or more network interface ports using an IP address. Any operational element within computing platform 1006 can perform sending and receiving operations using any of a range of network protocols, possibly including network protocols that send and receive packets (e.g., network protocol packet $1021_1$ and network protocol packet $1021_2$).

Computing platform 1006 may transmit and receive messages that can be composed of configuration data and/or any other forms of data and/or instructions organized into a data structure (e.g., communications packets). In some cases, the data structure includes program instructions (e.g., application code) communicated through the Internet 1048 and/or through any one or more instances of communications link 1015. Received program instructions may be processed and/or executed by a CPU as it is received and/or program instructions may be stored in any volatile or non-volatile storage for later execution. Program instructions can be transmitted via an upload (e.g., an upload from an access device over the Internet 1048 to computing platform 1006). Further, program instructions and/or the results of executing program instructions can be delivered to a particular user via a download (e.g., a download from computing platform 1006 over the Internet 1048 to an access device).

Configuration 1051 is merely one example configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

In some embodiments, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to management of block stores. Various implementations of the data repository comprise storage media organized to hold a series of records and/or data structures.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 10B:
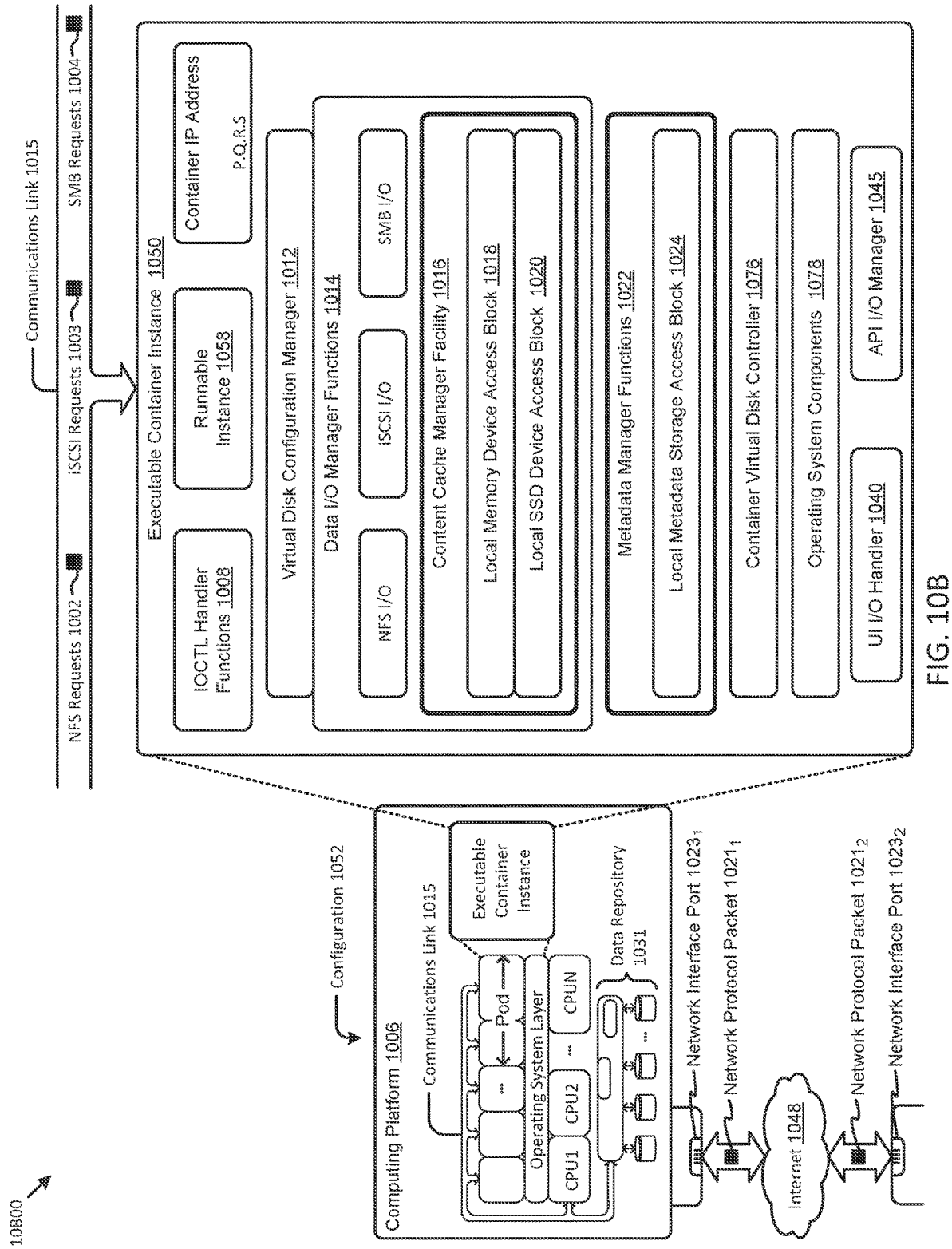

FIG. 10B depicts a block diagram illustrating another virtualization system architecture 10B00 configured to implement one or more aspects of the present embodiments. As shown in FIG. 10B, virtualization system architecture 10B00 includes a collection of interconnected components, including an executable container instance 1050 in a configuration 1052. Configuration 1052 includes a computing platform 1006 that supports an operating system layer (as shown) that performs addressing functions such as providing access to external requestors (e.g., user virtual machines or other processes) via an IP address (e.g., "P.Q.R.S", as shown). Providing access to external requestors can include implementing all or portions of a protocol specification (e.g., "http:") and possibly handling port-specific functions. In some embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node may communicate directly with storage devices on the second node.

The operating system layer can perform port forwarding to any executable container (e.g., executable container instance 1050). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance can serve as an instance of an application container or as a controller executable container. Any executable container of any sort can be rooted in a directory system and can be configured to be accessed by file system commands (e.g., "ls" or "ls-a", etc.). The executable container might optionally include operating system components 1078, however such a separate set of operating system components need not be provided. As an alternative, an executable container can include runnable instance 1058, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 1076. Such a container virtual disk controller can perform any of the functions that the aforementioned CVM virtual disk controller 1026 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 10C:
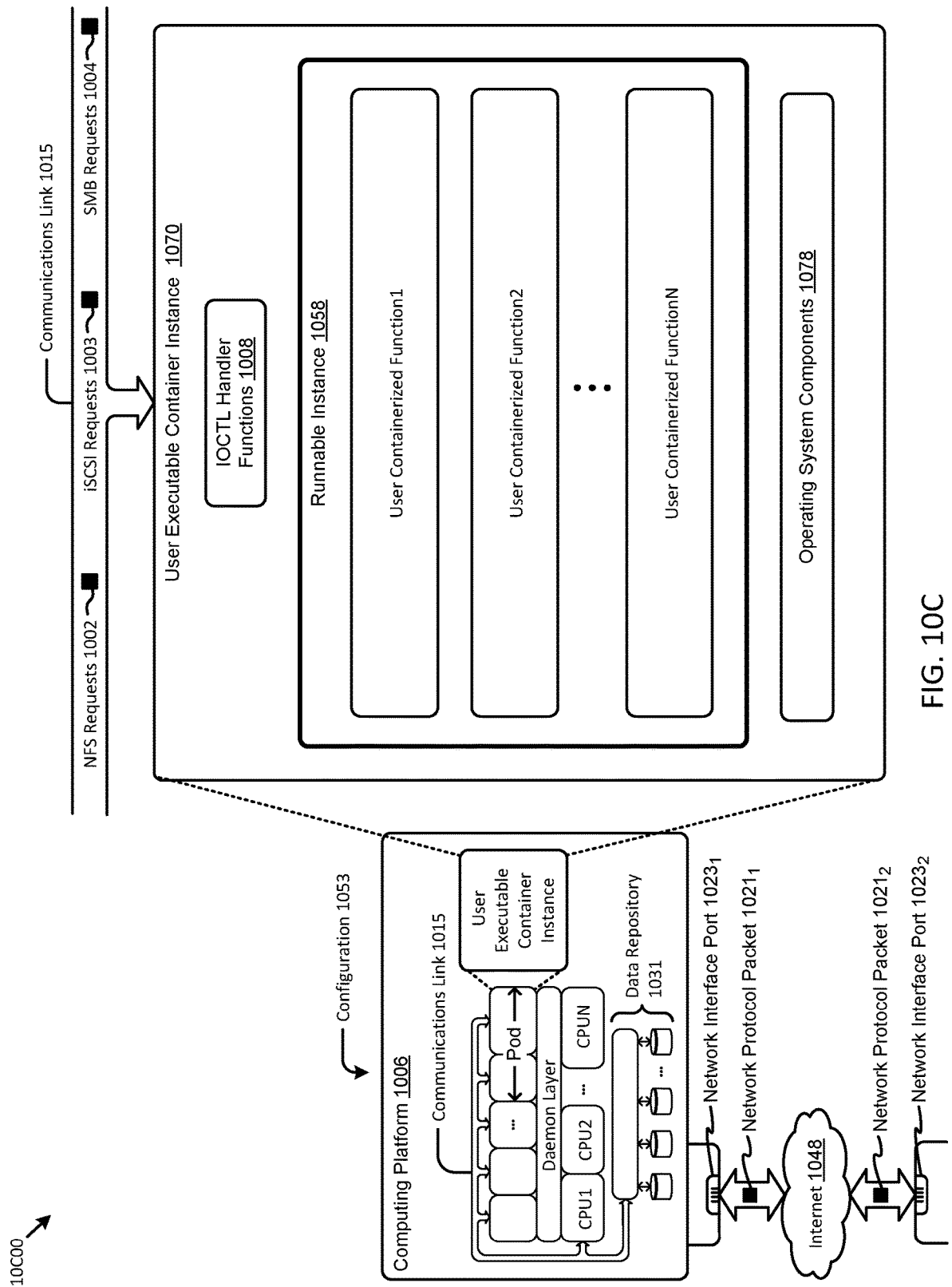

FIG. 10C is a block diagram illustrating virtualization system architecture 10000 configured to implement one or more aspects of the present embodiments. As shown in FIG. 10C, virtualization system architecture 10000 includes a collection of interconnected components, including a user executable container instance in configuration 1053 that is further described as pertaining to user executable container instance 1070. Configuration 1053 includes a daemon layer (as shown) that performs certain functions of an operating system.

User executable container instance 1070 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 1058). In some cases, the shown operating system components 1078 comprise portions of an operating system, which portions are interfaced with or included in the runnable instance and/or any user containerized functions. In some embodiments of a daemon-assisted containerized architecture, computing platform 1006 might or might not host operating system components other than operating system components 1078. More specifically, the shown daemon might or might not host operating system components other than operating system components 1078 of user executable container instance 1070.

In some embodiments, the virtualization system architecture 10A00, 10B00, and/or 10000 can be used in any combination to implement a distributed platform that contains multiple servers and/or nodes that manage multiple tiers of storage where the tiers of storage might be formed using the shown data repository 1031 and/or any forms of network accessible storage. As such, the multiple tiers of storage may include storage that is accessible over communications link 1015. Such network accessible storage may include cloud storage or networked storage (e.g., a SAN or storage area network). Unlike prior approaches, the disclosed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In some embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

In some embodiments, any one or more of the aforementioned virtual disks can be structured from any one or more of the storage devices in the storage pool. In some embodiments, a virtual disk is a storage abstraction that is exposed by a controller virtual machine or container to be used by another virtual machine or container. In some embodiments, the virtual disk is exposed by operation of a storage protocol such as iSCSI or NFS or SMB. In some embodiments, a virtual disk is mountable. In some embodiments, a virtual disk is mounted as a virtual storage device.

In some embodiments, some or all of the servers or nodes run virtualization software. Such virtualization software might include a hypervisor (e.g., as shown in configuration 1051) to manage the interactions between the underlying hardware and user virtual machines or containers that run client software.

Distinct from user virtual machines or user executable containers, a special controller virtual machine (e.g., as depicted by controller virtual machine instance 1030) or as a special controller executable container is used to manage certain storage and I/O activities. Such a special controller virtual machine is sometimes referred to as a controller executable container, a service virtual machine (SVM), a service executable container, or a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

Figure 10D:
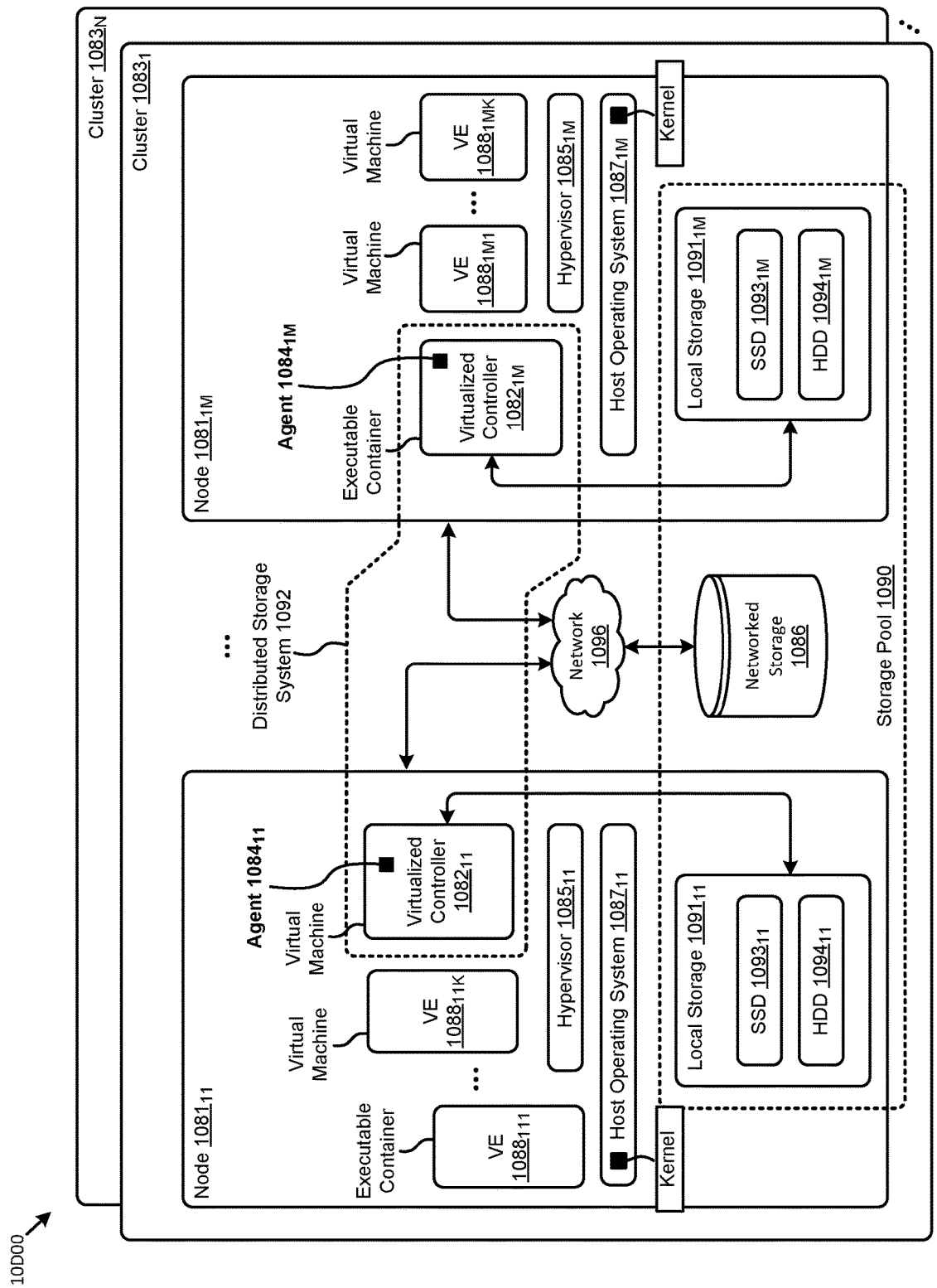

FIG. 10D is a block diagram illustrating virtualization system architecture 10D00 configured to implement one or more aspects of the present embodiments. As shown in FIG. 10D, virtualization system architecture 10D00 includes a distributed virtualization system that includes multiple clusters (e.g., cluster $1083_1$, ..., cluster $1083_N$) comprising multiple nodes that have multiple tiers of storage in a storage pool. Representative nodes (e.g., node $1081_{11}$ ..., node $1081_{1M}$) and storage pool 1090 associated with cluster $1083_1$ are shown. Each node can be associated with one server, multiple servers, or portions of a server. The nodes can be associated (e.g., logically and/or physically) with the clusters. As shown, the multiple tiers of storage include storage that is accessible through a network 1096, such as a networked storage 1086 (e.g., a storage area network or SAN, network attached storage or NAS, etc.). The multiple tiers of storage further include instances of local storage (e.g., local storage $1091_{11}$, ..., local storage $1091_{1M}$). For example, the local storage can be within or directly attached to a server and/or appliance associated with the nodes. Such local storage can include solid state drives (SSD $1093_{11}$, ..., SSD $1093_{1M}$), hard disk drives (HDD $1094_{11}$, ..., HDD $1094_{1M}$), and/or other storage devices.

As shown, any of the nodes of the distributed virtualization system can implement one or more user virtualized entities (e.g., VE $1088_{111}$, ..., VE $1088_{11K}$, ..., VE $1088_{1M1}$, VE $1088_{1MK}$), such as virtual machines (VMs) and/or executable containers. The VMs can be characterized as software-based computing "machines" implemented in a container-based or hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $1087_{11}$, ..., host operating system $1087_{1M}$), while the VMs run multiple applications on various respective guest operating systems. Such flexibility can be facilitated at least in part by a hypervisor (e.g., hypervisor $1085_{11}$, ..., hypervisor $1085_{1M}$), which hypervisor is logically located between the various guest operating systems of the VMs and the host operating system of the physical infrastructure (e.g., node).

As an alternative, executable containers may be implemented at the nodes in an operating system-based virtualization environment or in a containerized virtualization environment. The executable containers are implemented at the nodes in an operating system virtualization environment or container virtualization environment. The executable containers can include groups of processes and/or resources (e.g., memory, CPU, disk, etc.) that are isolated from the node host computer and other containers. Such executable containers directly interface with the kernel of the host operating system (e.g., host operating system $1087_{11}$, ..., host operating system $1087_{1M}$) without, in most cases, a hypervisor layer. This lightweight implementation can facilitate efficient distribution of certain software components, such as applications or services (e.g., micro-services). Any node of a distributed virtualization system can implement both a hypervisor-assisted virtualization environment and a container virtualization environment for various purposes. Also, any node of a distributed virtualization system can implement any one or more types of the foregoing virtualized controllers so as to facilitate access to storage pool 1090 by the VMs and/or the executable containers.

Multiple instances of such virtualized controllers can coordinate within a cluster to form the distributed storage system 1092 which can, among other operations, manage the storage pool 1090. This architecture further facilitates efficient scaling in multiple dimensions (e.g., in a dimension of computing power, in a dimension of storage space, in a dimension of network bandwidth, etc.).

In some embodiments, a particularly-configured instance of a virtual machine at a given node can be used as a virtualized controller in a hypervisor-assisted virtualization environment to manage storage and I/O (input/output or IO) activities of any number or form of virtualized entities. For example, the virtualized entities at node $1081_{11}$ can interface with a controller virtual machine (e.g., virtualized controller $1082_{11}$) through hypervisor $1085_{11}$ to access data of storage pool 1090. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 1092. For example, a hypervisor at one node in the distributed storage system 1092 might correspond to software from a first vendor, and a hypervisor at another node in the distributed storage system 1092 might correspond to a second software vendor. As another virtualized controller implementation example, executable containers can be used to implement a virtualized controller (e.g., virtualized controller $1082_{1M}$) in an operating system virtualization environment at a given node. In this case, for example, the virtualized entities at node $1081_{1M}$ can access the storage pool 1090 by interfacing with a controller container (e.g., virtualized controller $1082_{1M}$) through hypervisor $1085_{1M}$ and/or the kernel of host operating system $1087_{1M}$.

In some embodiments, one or more instances of an agent can be implemented in the distributed storage system 1092 to facilitate the herein disclosed techniques. Specifically, agent $1084_{11}$ can be implemented in the virtualized controller $1082_{11}$, and agent $1084_{1M}$ can be implemented in the virtualized controller $1082_{1M}$. Such instances of the virtualized controller can be implemented in any node in any cluster. Actions taken by one or more instances of the virtualized controller can apply to a node (or between nodes), and/or to a cluster (or between clusters), and/or between any resources or subsystems accessible by the virtualized controller or their agents.

Exemplary Computer System

Figure 11:
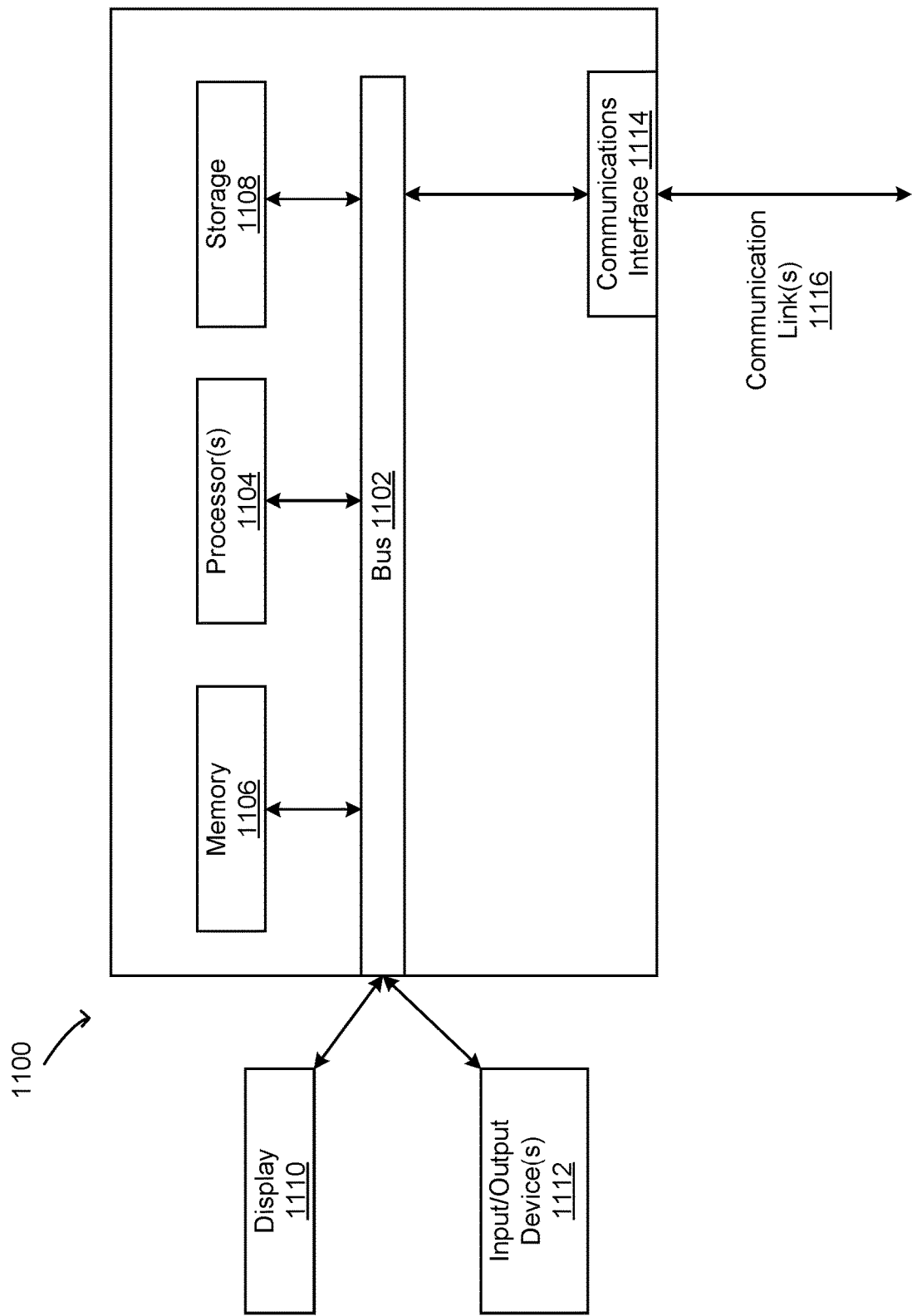
FIG. 11 is a block diagram illustrating a computer system configured to implement one or more aspects of the present disclosure.

FIG. 11 is a block diagram illustrating a computer system 1100 configured to implement one or more aspects of the present embodiments. In some embodiments, computer system 1100 may be representative of a computer system for implementing one or more aspects of the embodiments disclosed in FIGS. 1-10D. In some embodiments, computer system 1100 is a server machine operating in a data center or a cloud computing environment. suitable for implementing an embodiment of the present disclosure. As shown, computer system 1100 includes a bus 1102 or other communication mechanism for communicating information, which interconnects subsystems and devices, such as one or more processors 1104, memory 1106, storage 1108, optional display 1110, one or more input/output devices 1112, and a communications interface 1114. Computer system 1100 described herein is illustrative and any other technically feasible configurations fall within the scope of the present disclosure.

The one or more processors 1104 include any suitable processors implemented as a central processing unit (CPU), a graphics processing unit (GPU), an application-specific integrated circuit (ASIC), a field programmable gate array (FPGA), an artificial intelligence (AI) accelerator, any other type of processor, or a combination of different processors, such as a CPU configured to operate in conjunction with a GPU. In general, the one or more processors 1104 may be any technically feasible hardware unit capable of processing data and/or executing software applications. Further, in the context of this disclosure, the computing elements shown in computer system 1100 may correspond to a physical computing system (e.g., a system in a data center) or may be a virtual computing instance, such as any of the virtual machines described in FIGS. 10A-10D.

Memory 1106 includes a random access memory (RAM) module, a flash memory unit, and/or any other type of memory unit or combination thereof. The one or more processors 1104, and/or communications interface 1114 are configured to read data from and write data to memory 1106. Memory 1106 includes various software programs that include one or more instructions that can be executed by the one or more processors 1104 and application data associated with said software programs.

Storage 1108 includes non-volatile storage for applications and data, and may include one or more fixed or removable disk drives, HDDs, SSD, NVMes, vDisks, flash memory devices, and/or other magnetic, optical, and/or solid state storage devices.

Communications interface 1114 includes hardware and/or software for coupling computer system 1100 to one or more communication links 1116. The one or more communication links 1115 may include any technically feasible type of communications network that allows data to be exchanged between computer system 1100 and external entities or devices, such as a web server or another networked computing system. For example, the one or more communication links 1115 may include one or more wide area networks (WANs), one or more local area networks (LANs), one or more wireless (WiFi) networks, the Internet, and/or the like.

In sum, a snapshot of a virtual memory of a virtual machine can be taken to a persistent memory. The snapshot can be taken with or without pausing the virtual machine. In some embodiments, a write request that is received during the snapshot operation can be restricted from being applied until after the associated portion of the virtual memory is copied to the snapshot. A portion of the virtual memory with an outstanding write request can be copied to the snapshot ahead of a normal order of copying. In some embodiments, portions of the virtual memory can be annotated for copying and un-annotated when copied, but can be re-annotated for copying if a write request is received for the portion during the snapshot operation.

At least one technical advantage of the disclosed techniques relative to the prior art is that the taking of a snapshot of virtual memory of a virtual machine no longer requires a pause of the VM and/or a suspension of access. Accordingly, snapshots of the virtual memory can be taken more often with reduced or minimal impact on the performance of the VM compared to conventional approaches. More frequent snapshots provide more protection for the consistency of data included in the virtual machine. These technical advantages provide one or more technological advancements or improvements over prior art approaches.

1. In some embodiments, one or more non-transitory computer-readable media store program instructions that, when executed by one or more processors, cause the one or more processors to perform steps of allocating, in a persistent memory, one or more blocks associated with a virtual memory; detecting a write request associated with a first portion of the virtual memory; in response to detecting the write request associated with the first portion, prioritizing the first portion; based on the prioritizing, copying the first portion into the one or more blocks in the persistent memory ahead of a second portion of the virtual memory; and after copying the first portion: applying the write request to the first portion; and copying the second portion into the one or more blocks in the persistent memory.

2. The one or more non-transitory computer-readable media of clause 1, wherein the steps further comprise, before copying the first portion and the second portion, setting a permission of the first portion and a permission of the second portion to read-only.

3. The one or more non-transitory computer-readable media of clauses 1 or 2, wherein the second portion is ahead of the first portion in a copying order prior to the prioritizing.

4. The one or more non-transitory computer-readable media of any of clauses 1-3, wherein prioritizing the first portion comprises queueing the first portion in a priority queue.

5. The one or more non-transitory computer-readable media of any of clauses 1-4, wherein detecting the write request associated with the first portion comprises receiving the write request while a permission of the first portion is read-only.

6. The one or more non-transitory computer-readable media of any of clauses 1-5, wherein detecting the write request associated with the first portion comprises trapping the write request before copying the first portion.

7. The one or more non-transitory computer-readable media of any of clauses 1-6, wherein the steps further comprise, after copying the first portion, restoring a permission of the first portion.

8. The one or more non-transitory computer-readable media of any of clauses 1-7, wherein the second portion is copied according to a predefined order of portions of the virtual memory.

9. The one or more non-transitory computer-readable media of any of clauses 1-8, wherein the second portion is copied according to an address order of portions of the virtual memory.

10. In some embodiments, a method for taking a snapshot of a virtual memory of a virtual machine comprises allocating, in a persistent memory, one or more blocks associated with a virtual memory; detecting a write request associated with a first portion of the virtual memory; in response to detecting the write request associated with the first portion, prioritizing the first portion; based on the prioritizing, copying the first portion into the one or more blocks in the persistent memory ahead of a second portion of the virtual memory; and after copying the first portion: applying the write request to the first portion; and copying the second portion into the one or more blocks in the persistent memory.

11. The method of clause 10, further comprising, before copying the first portion and the second portion, setting a permission of the first portion and a permission of the second portion to read-only.

12. The method of clauses 10 or 11, wherein the second portion is ahead of the first portion in a copying order prior to the prioritizing.

13. The method of any of clauses 10-12, wherein prioritizing the first portion comprises queueing the first portion in a priority queue.

14. The method of any of clauses 10-13, wherein detecting the write request associated with the first portion comprises one or more of receiving the write request while a permission of the first portion is read-only, or trapping the write request before copying the first portion.

15. The method of any of clauses 10-14, further comprising, after copying the first portion, restoring a permission of the first portion.

16. The method of any of clauses 10-15, wherein the second portion is copied according to an address order of portions of the virtual memory.

17. In some embodiments, a system comprises a memory storing a set of instructions; and one or more processors that, when executing the set of instructions, are configured to allocate, in a persistent memory, one or more blocks associated with a virtual memory; detect a write request associated with a first portion of the virtual memory; in response to detecting the write request associated with the first portion, prioritize the first portion; based on the prioritizing, copy the first portion into the one or more blocks in the persistent memory ahead of a second portion of the virtual memory; and after copying the first portion: apply the write request to the first portion; and copy the second portion into the one or more blocks in the persistent memory.

18. The system of clause 17, wherein the one or more processors, when executing the set of instructions, are further configured to, before copying the first portion and the second portion, set a permission of the first portion and a permission of the second portion to read-only.

19. The system of clauses 17 or 18, wherein the second portion is ahead of the first portion in a copying order prior to the prioritizing.

20. The system of any of clauses 17-19, wherein the one or more processors, when executing the set of instructions, are further configured to queue the first portion in a priority queue.

21. The system of any of clauses 17-20, wherein the one or more processors, when executing the set of instructions, are further configured to one or more of receive the write request while a permission of the first portion is read-only, or trap the write request before copying the first portion.

22. The system of any of clauses 17-21, wherein the one or more processors, when executing the set of instructions, are further configured to, after copying the first portion, restore a permission of the first portion.

23. The system of any of clauses 17-22, wherein the second portion is copied according to an address order of portions of the virtual memory.

24. In some embodiments, one or more non-transitory computer-readable media store program instructions that, when executed by one or more processors, cause the one or more processors to perform steps of allocating, in a persistent memory, one or more blocks associated with a virtual memory; annotating a first portion of the virtual memory for copying in a first pass; copying the first portion into the one or more blocks in the persistent memory in the first pass; receiving a write request associated with the first portion; and in response to receiving the write request: applying the write request to the first portion; and annotating the first portion for copying in a second pass subsequent to the first pass.

25. The one or more non-transitory computer-readable media of clause 24, wherein the steps further comprise copying the first portion into the one or more blocks in the persistent memory in the second pass.

26. The one or more non-transitory computer-readable media of clauses 24 or 25, wherein the steps further comprise, after the first portion is copied into the one or more blocks in the persistent memory in the second pass, un-annotating the first portion.

27. The one or more non-transitory computer-readable media of any of clauses 24-26, wherein the steps further comprise un-annotating the first portion after copying the first portion in the first pass.

28. The one or more non-transitory computer-readable media of any of clauses 24-27, wherein the steps further comprise receiving a write request associated with a second portion of the virtual memory, wherein second portion is annotated for copying in the first pass; and applying the write request to the second portion.

29. The one or more non-transitory computer-readable media of any of clauses 24-28, wherein the steps further comprise, after the second portion is copied into the one or more blocks in the persistent memory, un-annotating the second portion.

30. The one or more non-transitory computer-readable media of any of clauses 24-29, wherein the steps further comprise, in response to determining that at least one portion of the virtual memory is annotated, copying the at least one portion of the virtual memory into the persistent memory in a subsequent pass.

31. The one or more non-transitory computer-readable media of any of clauses 24-30, wherein the steps further comprise, in response to determining that no portion of the virtual memory is annotated, ceasing copying of the virtual memory into the persistent memory.

32. In some embodiments, a method for taking a snapshot of a virtual memory of a virtual machine comprises allocating, in a persistent memory, one or more blocks associated with a virtual memory; annotating a first portion of the virtual memory for copying in a first pass; copying the first portion into the one or more blocks in the persistent memory in the first pass; receiving a write request associated with the first portion; and in response to receiving the write request: applying the write request to the first portion; and annotating the first portion for copying in a second pass subsequent to the first pass.

33. The method of clause 32, further comprising copying the first portion into the one or more blocks in the persistent memory in the second pass.

34. The method of clauses 32 or 33, further comprising, after the first portion is copied into the one or more blocks in the persistent memory in the second pass, un-annotating the first portion.

35. The method of any of clauses 32-34, further comprising un-annotating the first portion after copying the first portion in the first pass.

36. The method of any of clauses 32-35, further comprising receiving a write request associated with a second portion of the virtual memory, wherein second portion is annotated for copying in the first pass; and applying the write request to the second portion.

37. The method of any of clauses 32-36, further comprising, after the second portion is copied into the one or more blocks in the persistent memory, un-annotating the second portion.

38. The method of any of clauses 32-37, further comprising, in response to determining that at least one portion of the virtual memory is annotated, copying the at least one portion of the virtual memory into the persistent memory in a subsequent pass; and in response to determining that no portion of the virtual memory is annotated, ceasing copying of the virtual memory into the persistent memory.

39. In some embodiments, a system comprises a memory storing a set of instructions; and one or more processors that, when executing the set of instructions, are configured to allocate, in a persistent memory, one or more blocks associated with a virtual memory; annotate a first portion of the virtual memory for copying in a first pass; copy the first portion into the one or more blocks in the persistent memory in the first pass; receive a write request associated with the first portion; and in response to receiving the write request: apply the write request to the first portion; and annotate the first portion for copying in a second pass subsequent to the first pass.

40. The system of clause 39, wherein the one or more processors, when executing the set of instructions, are further configured to copy the first portion into the one or more blocks in the persistent memory in the second pass.

41. The system of clauses 39 or 40, wherein the one or more processors, when executing the set of instructions, are further configured to, after the first portion is copied into the one or more blocks in the persistent memory in the second pass, un-annotate the first portion.

42. The system of any of clauses 39-41, wherein the one or more processors, when executing the set of instructions, are further configured to un-annotate the first portion after copying the first portion in the first pass.

43. The system of any of clauses 39-42, wherein the one or more processors, when executing the set of instructions, are further configured to receive a write request associated with a second portion of the virtual memory, wherein second portion is annotated for copying in the first pass; and apply the write request to the second portion.

44. The system of any of clauses 39-43, wherein the one or more processors, when executing the set of instructions, are further configured to, after the second portion is copied into the one or more blocks in the persistent memory, un-annotate the second portion.

45. The system of any of clauses 39-44, wherein the one or more processors, when executing the set of instructions, are further configured to in response to determining that at least one portion of the virtual memory is annotated, copy the at least one portion of the virtual memory into the persistent memory in a subsequent pass; and in response to determining that no portion of the virtual memory is annotated, cease copying of the virtual memory into the persistent memory.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. One or more non-transitory computer-readable media storing program instructions that, when executed by one or more processors, cause the one or more processors to perform steps of:
    allocating, in a persistent memory, a plurality of blocks for recording a snapshot of a virtual memory, the virtual memory comprising a first portion and a second portion; and
    while performing the snapshot of the virtual memory:
        detecting a write request associated with the first portion of the virtual memory;
        in response to detecting the write request associated with the first portion, prioritizing snapshotting of the first portion of the virtual memory ahead of snapshotting of the second portion of the virtual memory;
        based on the prioritizing, copying the first portion of the virtual memory into the plurality of blocks in the persistent memory ahead of the second portion of the virtual memory; and
        after copying the first portion:
            applying the write request to the first portion; and
            copying the second portion into the plurality of blocks in the persistent memory.

2. The one or more non-transitory computer-readable media of claim 1, wherein the steps further comprise, before copying the first portion and the second portion, setting a permission of the first portion and a permission of the second portion to read-only.

3. The one or more non-transitory computer-readable media of claim 1, wherein the second portion is ahead of the first portion in a copying order prior to the prioritizing.

4. The one or more non-transitory computer-readable media of claim 1, wherein prioritizing snapshotting of the first portion comprises queueing the first portion in a priority queue.

5. The one or more non-transitory computer-readable media of claim 1, wherein detecting the write request associated with the first portion comprises receiving the write request while a permission of the first portion is read-only.

6. The one or more non-transitory computer-readable media of claim 1, wherein detecting the write request associated with the first portion comprises trapping the write request before copying the first portion.

7. The one or more non-transitory computer-readable media of claim 1, wherein the steps further comprise, after copying the first portion, restoring a permission of the first portion.

8. The one or more non-transitory computer-readable media of claim 1, wherein the second portion is copied according to a predefined order of portions of the virtual memory.

9. The one or more non-transitory computer-readable media of claim 1, wherein the second portion is copied according to an address order of portions of the virtual memory.

10. A method for taking a snapshot of a virtual memory of a virtual machine, comprising:
    allocating, in a persistent memory, a plurality of blocks for recording a snapshot of a virtual memory, the virtual memory comprising a first portion and a second portion; and
    while performing the snapshot of the virtual memory:
        detecting a write request associated with the first portion of the virtual memory;
        in response to detecting the write request associated with the first portion, prioritizing snapshotting of the first portion of the virtual memory ahead of snapshotting of the second portion of the virtual memory;
        based on the prioritizing, copying the first portion of the virtual memory into the plurality of blocks in the persistent memory ahead of the second portion of the virtual memory; and
        after copying the first portion:
            applying the write request to the first portion; and
            copying the second portion into the plurality of blocks in the persistent memory.

11. The method of claim 10, further comprising, before copying the first portion and the second portion, setting a permission of the first portion and a permission of the second portion to read-only.

12. The method of claim 10, wherein the second portion is ahead of the first portion in a copying order prior to the prioritizing.

13. The method of claim 10, wherein prioritizing the first portion comprises queueing the first portion in a priority queue.

14. The method of claim 10, wherein detecting the write request associated with the first portion comprises one or more of:
    receiving the write request while a permission of the first portion is read-only, or
    trapping the write request before copying the first portion.

15. The method of claim 10, further comprising, after copying the first portion, restoring a permission of the first portion.

16. The method of claim 10, wherein the second portion is copied according to an address order of portions of the virtual memory.

17. A system, comprising:
a memory storing a set of instructions; and
one or more processors that, when executing the set of instructions, are configured to:
allocate, in a persistent memory, a plurality of blocks for recording a snapshot of a virtual memory, the virtual memory comprising a first portion and a second portion; and
while performing the snapshot of the virtual memory:
detect a write request associated with the first portion of the virtual memory;
in response to detecting the write request associated with the first portion, prioritize snapshotting of the first portion of the virtual memory ahead of snapshotting of the second portion of the virtual memory;
based on the prioritizing, copy the first portion of the virtual memory into the plurality of blocks in the persistent memory ahead of the second portion of the virtual memory; and
after copying the first portion:
apply the write request to the first portion; and
copy the second portion into the plurality of blocks in the persistent memory.

18. The system of claim 17, wherein the one or more processors, when executing the set of instructions, are further configured to, before copying the first portion and the second portion, set a permission of the first portion and a permission of the second portion to read-only.

19. The system of claim 17, wherein the second portion is ahead of the first portion in a copying order prior to the prioritizing.

20. The system of claim 17, wherein the one or more processors, when executing the set of instructions, are further configured to queue the first portion in a priority queue.

21. The system of claim 17, wherein the one or more processors, when executing the set of instructions, are further configured to one or more of:
receive the write request while a permission of the first portion is read-only, or
trap the write request before copying the first portion.

22. The system of claim 17, wherein the one or more processors, when executing the set of instructions, are further configured to, after copying the first portion, restore a permission of the first portion.

23. The system of claim 17, wherein the second portion is copied according to an address order of portions of the virtual memory.

* * * * *